US010630100B2

(12) United States Patent
Van Straten

(10) Patent No.: US 10,630,100 B2
(45) Date of Patent: Apr. 21, 2020

(54) ELECTRICITY GENERATOR HAVING LINEARLY DEPLOYED SOLAR PANELS

(71) Applicant: George A. Van Straten, Chassell, MI (US)

(72) Inventor: George A. Van Straten, Chassell, MI (US)

( * ) Notice: Subject to any disclaimer, the term of this patent is extended or adjusted under 35 U.S.C. 154(b) by 747 days.

(21) Appl. No.: 15/010,021

(22) Filed: Jan. 29, 2016

(65) Prior Publication Data

US 2017/0222475 A1 Aug. 3, 2017

(51) Int. Cl.
*H02J 7/35* (2006.01)
*H02S 30/20* (2014.01)

(52) U.S. Cl.
CPC .............. *H02J 7/355* (2013.01); *H02S 30/20* (2014.12)

(58) Field of Classification Search
CPC .......... H02J 7/355; H02J 7/0042; H02S 30/20
USPC ........................................ 320/108, 101, 107
See application file for complete search history.

(56) References Cited

U.S. PATENT DOCUMENTS

| | | | |
|---|---|---|---|
| 6,396,239 B1 | 5/2002 | Benn et al. | |
| 7,230,819 B2 | 6/2007 | Muchow et al. | |
| 7,749,380 B2 | 7/2010 | Yungner et al. | |
| 8,043,499 B2 | 10/2011 | Saeed et al. | |
| 8,295,033 B2 | 10/2012 | Van Straten | |
| 8,299,645 B2 * | 10/2012 | Muchow .................. | F03D 9/10 290/55 |
| 8,539,724 B2 | 9/2013 | Bullivant et al. | |
| 8,654,512 B2 | 2/2014 | Van Straten | |
| 8,664,511 B2 | 3/2014 | Swatek et al. | |
| 8,720,125 B2 | 5/2014 | Andretich | |
| 8,854,794 B2 * | 10/2014 | Van Straten ............. | H02S 40/38 361/601 |
| 9,246,035 B2 * | 1/2016 | Eaton, Jr. ............... | H01L 31/042 |
| 9,780,720 B2 * | 10/2017 | Ansari .................... | F03D 13/40 |
| 10,374,451 B2 * | 8/2019 | Curlett .................... | H02J 7/007 |
| 2005/0218651 A1 | 10/2005 | Lamm | |
| 2006/0137348 A1 | 6/2006 | Pas | |
| 2006/0137488 A1 | 6/2006 | Sakaue et al. | |
| 2008/0068782 A1 | 3/2008 | Muchow et al. | |
| 2009/0079161 A1 | 3/2009 | Muchow et al. | |
| 2010/0078942 A1 | 4/2010 | Bois | |
| 2010/0117368 A1 | 5/2010 | Benito et al. | |
| 2010/0140950 A1 | 6/2010 | Pitre | |
| 2011/0049992 A1 * | 3/2011 | Sant'Anselmo ........ | H02S 10/10 307/64 |

(Continued)

OTHER PUBLICATIONS

Hubner EnergyContainer Mobile Energy for the World, 8 pages, Copyright Sep. 2010, http://www.huebner-giessen.com/fileadmin/dokumente/Energie_Systeme/EnergyContainer/2011-03-14_EnergyContainer_en.pdf.

(Continued)

*Primary Examiner* — Richard V Muralidar
(74) *Attorney, Agent, or Firm* — Price Heneveld LLP

(57) ABSTRACT

A mobile electricity generator comprising a movable solar panel assembly that may be stored in the base and deployed to a use position is provided. The solar panel assembly includes a plurality of solar panels that slide relative to one another between deployed and collapsed positions. The solar panels may be actuated to track a solar energy source. The mobile electricity generator can further comprise a battery in electric communication with the solar panels for storing the electricity.

19 Claims, 21 Drawing Sheets

(56) References Cited

U.S. PATENT DOCUMENTS

| | | | | |
|---|---|---|---|---|
| 2012/0291847 A1* | 11/2012 | Rowe, Jr. | ................ | H02S 30/20 |
| | | | | 136/245 |
| 2017/0063290 A1* | 3/2017 | Kurlagunda | ............ | H02S 20/30 |
| 2017/0206329 A1* | 7/2017 | Capocasale | ......... | G06F 19/3418 |
| 2018/0083567 A1* | 3/2018 | Spisak | .................... | H02S 30/20 |
| 2018/0212551 A1* | 7/2018 | Polk | ........................ | H02S 10/40 |

OTHER PUBLICATIONS

REMUS (Renewable Energy Mobile Utility System), 4 pages, no date provided, http://www.titansentry.com/PDF/2008%2011%2012_REMUS%20brochure.pdf.

Alpha Energy Features Pre-Configured Solar and Wind Hybrid Power Supplies and Configurator Press Release, Alpha Technologies, 1 page, Oct. 27, 2009, http://www.alpha.com/Media/Documents/HPSConfigurator.pdf.

* cited by examiner

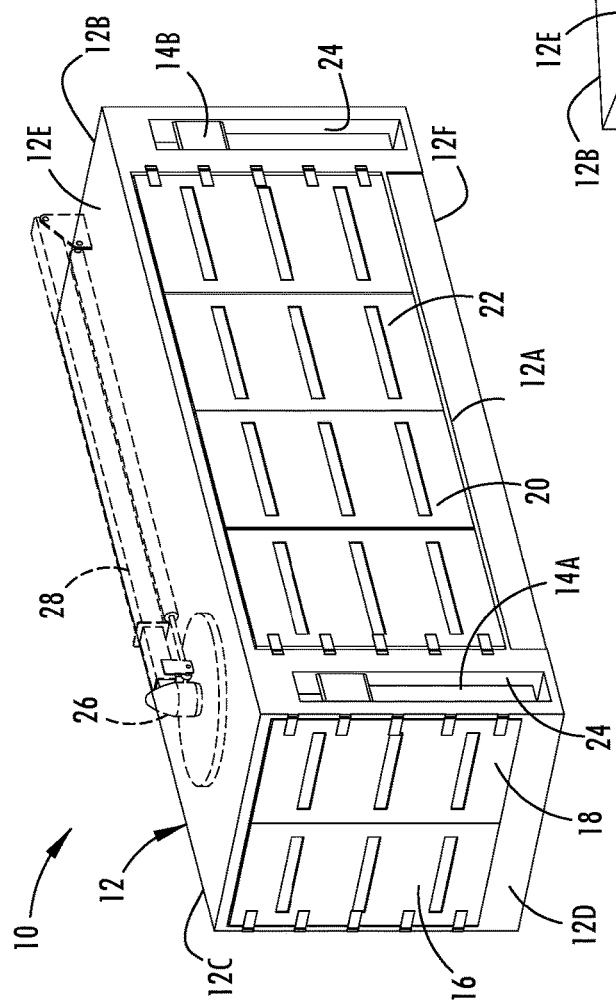
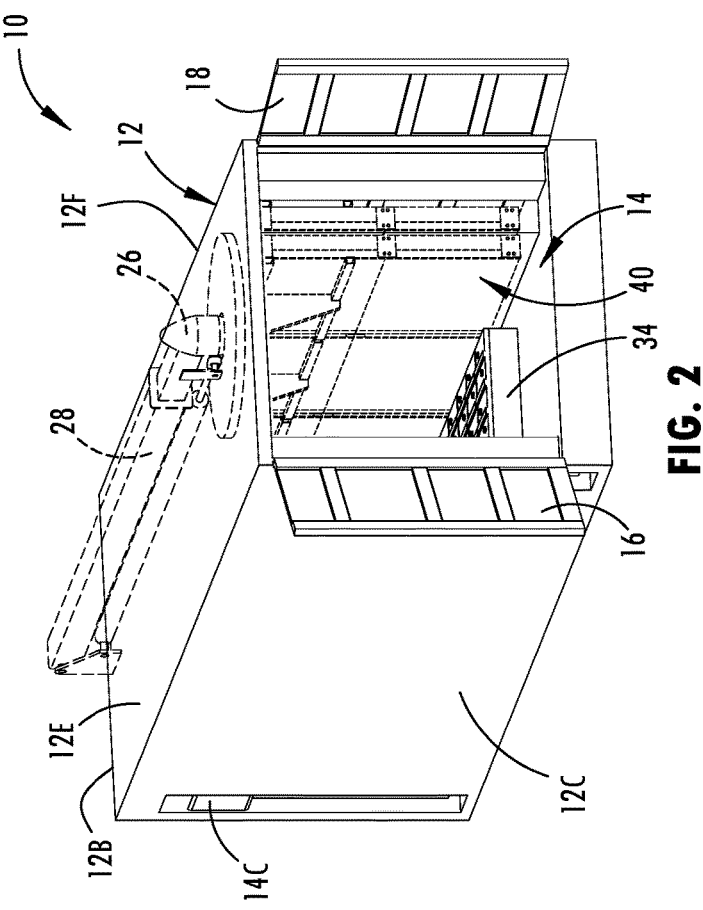
FIG. 1
FIG. 2

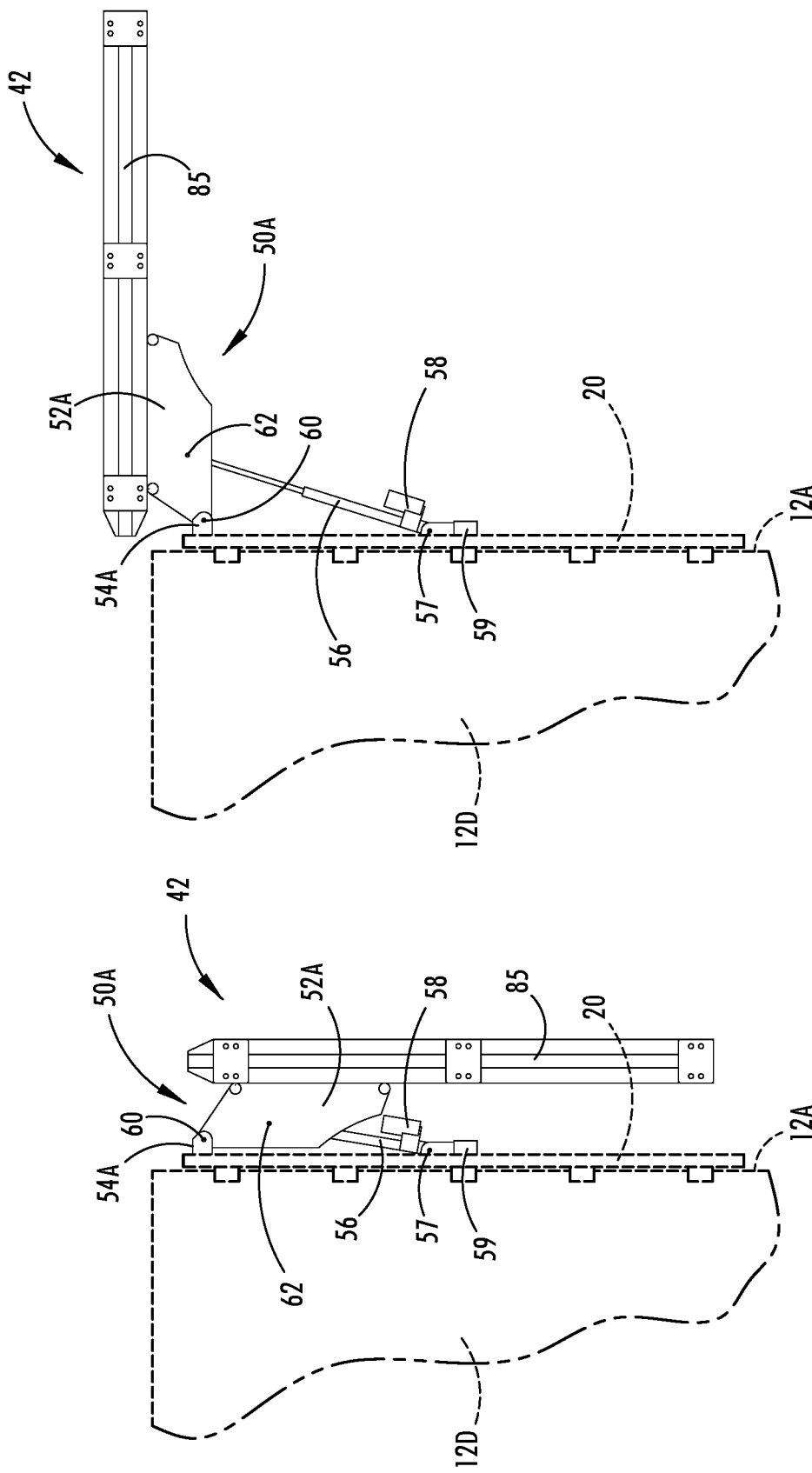

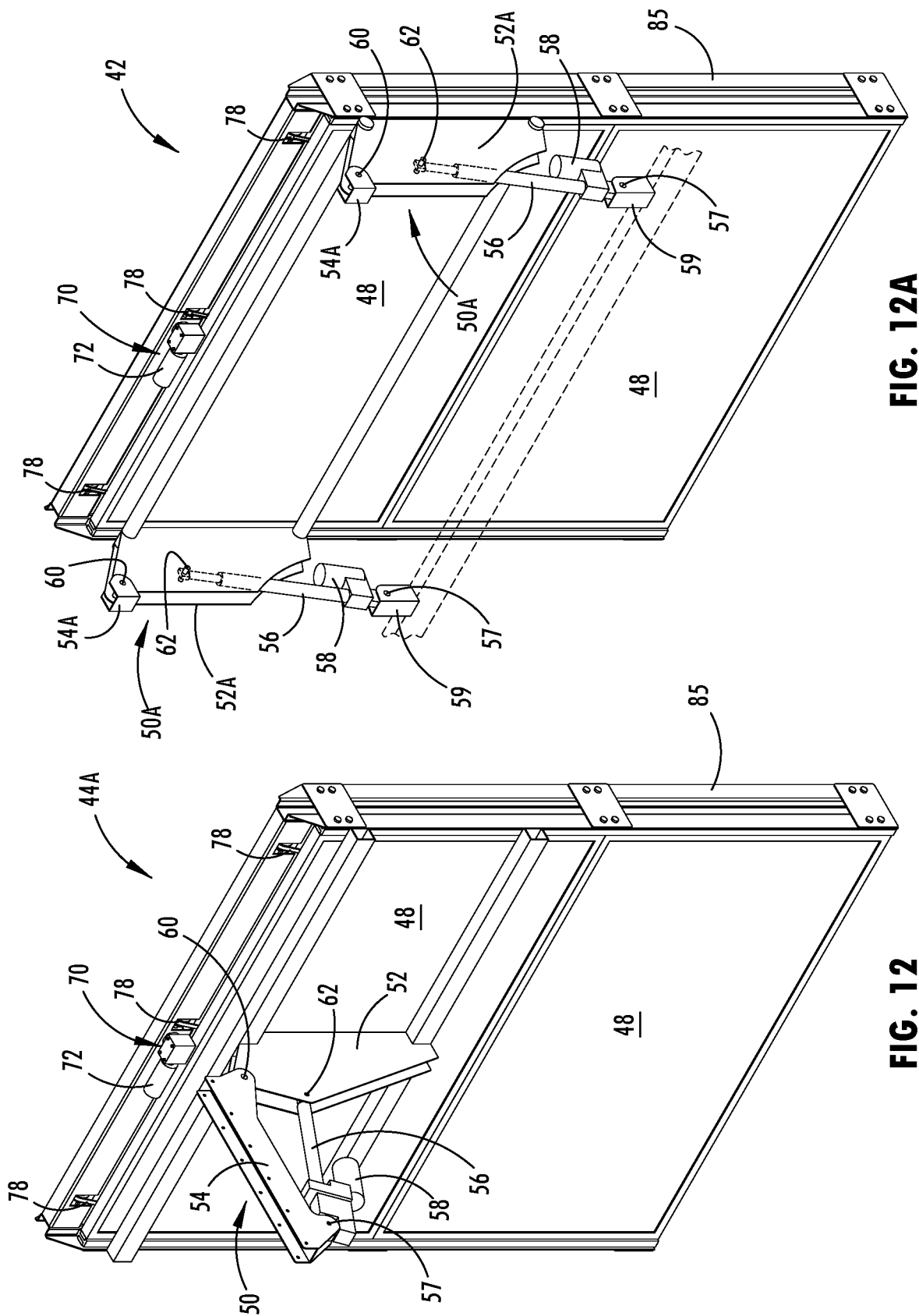

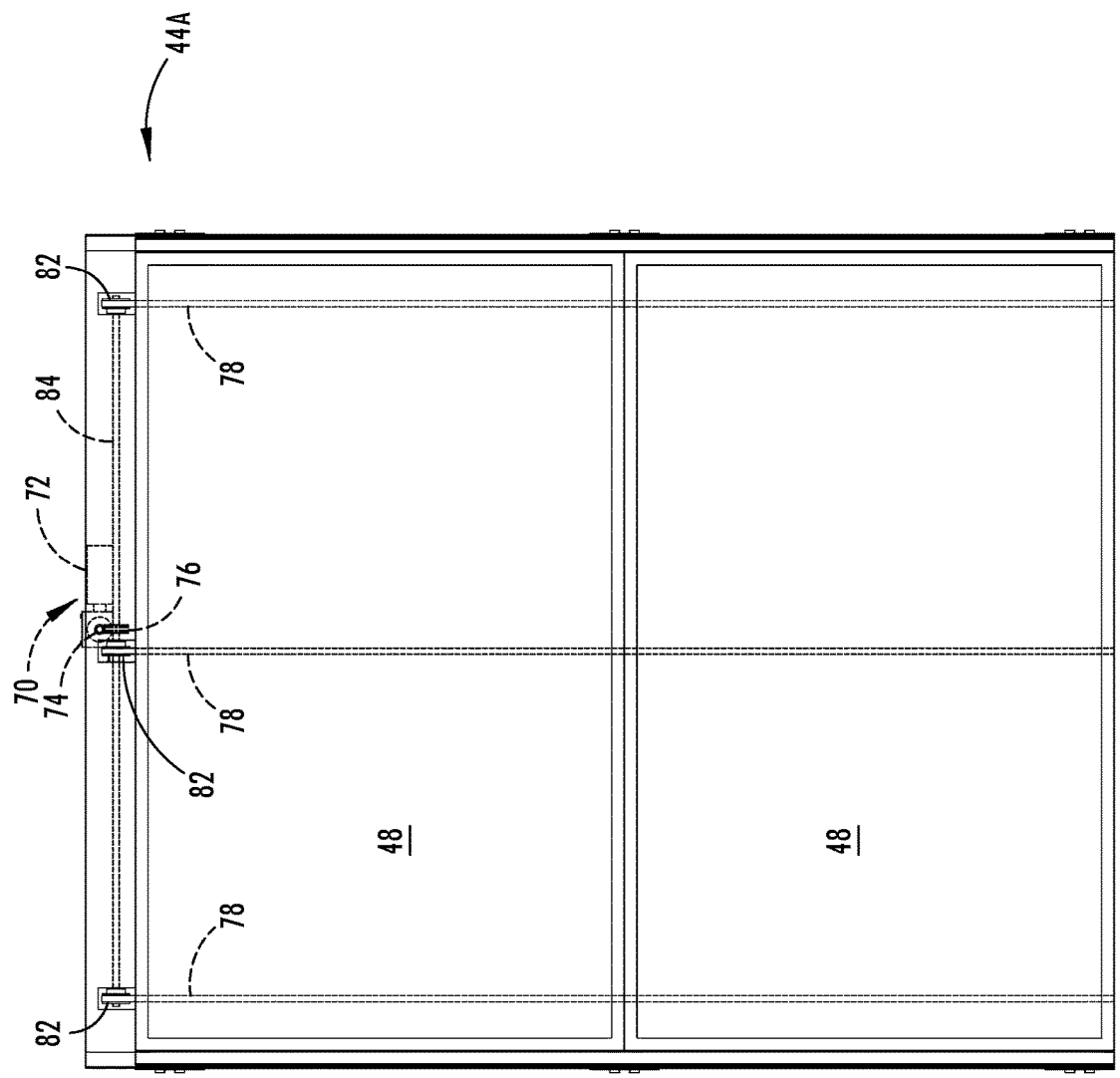

ELECTRICITY GENERATOR HAVING LINEARLY DEPLOYED SOLAR PANELS

BACKGROUND OF THE INVENTION

The present invention generally relates to a mobile electricity generator using a plurality of solar panels.

SUMMARY OF THE INVENTION

Described herein are several embodiments of a deployable electricity generator that uses sunlight and may further use wind and/or fuel as means to generate electricity. A method of using the electricity generator to generate electricity to power one or more devices that requires electricity is additionally described herein.

According to one aspect of the present invention, an electricity generator is provided. The electricity generator includes a base comprising side walls defining an interior volume, wherein at least one of the side walls comprises one or more doors for allowing access to the interior volume. The electricity generator also includes a movable solar panel assembly comprising a support structure coupled to a track for allowing movement of the solar panel assembly between a stowed position within the interior volume and a use position outside of the interior volume. The solar panel assembly comprises a plurality of solar panels that slide relative to one another between a deployed position and a collapsed position.

According to another aspect of the present invention, an electricity generator is provided. The electricity generator includes a base comprising side walls defining an interior volume, wherein at least one of the side walls comprises one or more doors for allowing access to the interior volume, and a movable solar panel assembly comprising a support structure that allows movement of the solar panel assembly between a stowed position within the interior volume and a use position outside the interior volume. The solar panel assembly comprises a plurality of solar panels that move linearly between extended and collapsed positions. The electricity generator also includes a sensor for sensing position of a solar energy source, and a controller for controlling orientation of the solar panel assembly based on the sensed solar energy.

According to a further aspect of the present invention, a method of producing electrical energy is provided. The method includes the steps of providing a movable solar panel assembly stowable within the interior volume of the base comprising side walls, wherein at least one of the side walls comprises one or more doors for allowing access to the interior volume, and moving the solar panel assembly from the interior volume to a use position outside the interior volume. The method also includes the steps of deploying the solar panel assembly by sliding a plurality of solar panel sheets relative to one another to an extended use position, and generating electrical energy with the solar panel.

BRIEF DESCRIPTION OF THE DRAWINGS

FIG. 1 is a front perspective view of an electricity generator having a linearly deployable solar panel assembly, according to one embodiment;

FIG. 2 is an end perspective view of the electricity generator shown in FIG. 1 further illustrating the interior volume with the solar panel assembly stored therein;

FIG. 11A is a partial cross-sectional view of the solar panel assembly taken through line XIA-XIA of FIG. 6;

FIG. 11B is a partial cross-sectional view of the solar panel assembly taken through line XIB-XIB of FIG. 7;

FIG. 12 is a rear perspective view of a central linear solar panel array shown in FIG. 6;

FIG. 12A is a rear perspective view of a door mounted solar panel array, shown in FIG. 6;

FIG. 12B is a rear view of the central solar panel array shown in FIG. 12 having a linear deployment actuation assembly;

FIG. 14A is an enlarged view of section XIVA of FIG. 14 further illustrating the solar panel linear actuation assembly in the fully deployed position;

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the embodiments as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
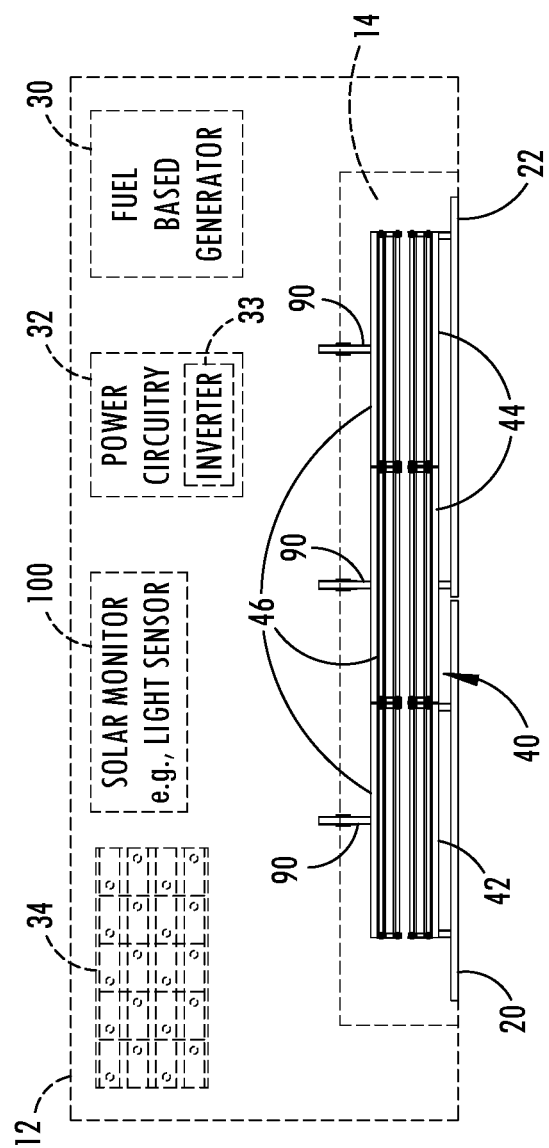
FIG. 3 is a top view of the electricity generator showing the solar panel assembly stored within the base container.

Referring now to FIGS. 1-3, an electricity generator 10 is illustrated for producing electrical power with one or more power sources packaged within a single unit, according to one embodiment. The electricity generator 10 has a base container 12 in the shape of a rectangular container, according to one embodiment. The rectangular container 12 includes a plurality of upstanding vertical side walls 12A-12D, a horizontal top 12E and a horizontal bottom 12F defining an interior volume 14. At least one of the side walls includes one or more doors for allowing access to the interior volume 14. In the embodiment shown, the container 12 includes front wall 12A, rear wall 12C, left end wall 12D, right end wall 12B, bottom 12F and top 12E. It should be appreciated that the container 12 may have other shapes and sizes according to other embodiments. The electricity generator 10 is a mobile electricity generator, according to one embodiment. Thus, it should further be appreciated that the container 12 may be transported, and thus is mobile. The container 12 may include wheels, skids or other structures that enhance the mobility of the electrical generator 10. Due to its mobility, the electrical generator 10 may be easily deployed in various locations as a permanent or temporary power source.

The electricity generator 10 includes a solar panel assembly 40 that is deployable to collect solar energy and produce electricity which may be used as a power source. In addition, the electricity generator 10 may also include a fuel based generator 30 for generating electricity from fuel energy, such as gasoline or diesel fuel. Further, the electricity generator 10 may include a wind turbine 26 for converting kinetic energy of wind into mechanical energy and further converting the mechanical energy into electricity. The wind turbine 26 may be supported by a telescopic boom 28 which may be attached to the top 12E as shown or elsewhere on the container 12. The wind turbine 26 may take any form, such as a traditional three-blade form or other forms. The telescopic boom 28 may be made from a material that is sufficiently sturdy to support the turbine 26, in use, such as steel or aluminum.

The container 12 is further shown having a plurality of retractable support legs 14A-14D located near the corners and stowable within portions 24 of the container 12. Each of the retractable support legs 24A-24D is capable of a retracted position as shown in FIGS. 1 and 2 in which the legs are at least partially housed upright within a cavity 24 provided in the container 12 in the retracted position. The retractable support legs 14A-14D can be actuated through manual cranks, hydraulics or electric motors between the deployed position and the extended position shown in FIG. 5. With the deployed legs in the extended position, the container 12 is further stabilized to prevent it from tipping over, particularly when the wind turbine 26 is deployed. The electricity generator 10 may be used without the support legs or with the support legs 24A-24D stowed such that the bottom 12F rests on the underlying ground.

The electricity generator 10 includes a solar panel assembly 40 having a plurality of linearly or slidingly deployable solar panels that may be stored in the base container 12 when not in use as shown in FIGS. 1-3 and deployable to a use position as shown in FIGS. 5-9. The solar panel assembly 40 is capable of transforming light into electricity and is also known as a photovoltaic module or panel. More specifically, the solar panel assembly 40 is an interconnected assembly of photovoltaic cells, which transform light energy (photons) from the sun into electricity. The solar panel assembly 40 can be in electric communication with an energy storage device such as a battery unit that has one or more batteries 34, which can be capable of at least temporarily storing the electricity generated by the solar panel assembly 40. The mobile electricity generator 10 can comprise less or any number of additional solar panels, because the more solar panels that are present, the more electricity the mobile electricity generator 10 can produce. The electricity generator 10 can include a solar monitor 100, such as a light source, and power circuitry 32 including an inverter 33. The solar panels of solar panel assembly 40, can be manipulated to optimally position the light-collecting surface of the solar panels towards the sun.

The electricity generator 10 can further comprise a fuel-based generator 30 as shown in FIG. 3. The fuel-based generator 30 can be capable of transforming fuel into electricity. The fuel-based generator 30 can be in electric communication with the batteries 34. The base container 12 defines inner chamber 14 (see FIG. 3) created by the bottom 12F, the top 12E, and the side walls 12A-12D. The inner chamber 14 can at least partially house the fuel-based generator 30 and the batteries 34. A fuel-based generator 30 is typically the combination of a combustion engine and an electrical generator (alternator). The fuel-based generator 30 can supply 220 volts alternating current (AC), according to one example. The fuel-based generator 30 can be supplied by Caterpillar, Cummins, or John Deere, among others. The fuel for the fuel-based generator 30 can be diesel fuel, but can also be without limitation biodiesel, natural gas, hydrogen, wood, oil, or gasoline.

The electricity generator 10 includes an energy storage device in the form of a battery bank which preferably includes one or more batteries 34 capable of at least partially storing the electricity generated by the various power sources. The energy storage device may include a plurality or bank of batteries 34 capable of storing a sufficient amount of electrical energy. As such, the battery or bank of batteries 34 is in electrical communication with the wind turbine 26, the fuel based generator 30 and the solar panel assembly 40. The batteries 34 are capable of at least temporarily storing the electricity generated from those aforementioned power generating sources. The batteries 34 can include a bank of 12 (twelve) volt deep cycle, zero maintenance batteries, according to one embodiment. The power generating sources including the wind turbine 26, the fuel based generator 30, and solar panel assembly 40 may generate direct current (DC) electricity and that DC electricity can be conducted to the batteries 34 for storage therein. Power circuitry 32 may be coupled to the batteries 34 and the power generating sources. The DC electricity generated by the wind turbine 26, the fuel based generator 30, and the solar panel assembly 40 can alternatively bypass the batteries 34 to provide an available direct power output. Additionally, one or more inverters 33 may be included in the power circuitry for inverting the electrical current from DC to alternating current (AC) to provide an AC electrical output that may be used to power one or more devices.

The power circuitry 32 and a solar monitor 100 such as one or more light sensors are shown in FIG. 3. The inverter 33 is in electronic communication with the batteries 34 and also with the turbine 26, and the fuel-based generator 30 and the solar panel assembly 40. The inverter 33 is capable of converting electricity, such as electricity from the batteries 34, into alternating current, such as 110 volt alternating current. Outback Power Technologies (Arlington, Wash.) makes such an inverter, as does SMA America, LLC under the trade name Sunny Boy. (In such an embodiment, the mobile electricity generator 10 may further comprise a length of alternating current cable (not shown) capable of conducting alternating current. The length of alternating current cable may be at least partially housed within the inner chamber 14 of the base container 12 and in electric communication with the inverter 33 and thus provides the same advantage as the length of direct current cable (not shown).

The electricity generator 10 can provide electricity to one or more devices that needs electricity. The generator 10 can provide electricity in whatever form the electrically powered device requires, such as direct current or alternating current at whatever voltage and current levels. The electricity can come from the charged batteries 34, or from the solar panel array 40, the wind turbine 26, or fuel-based generator 30, using a converter, inverter, and other devices as needed.

The electricity generator 10 may employ various structures and alternative configurations to the wind turbine 26, fuel based generator 30, the pack of batteries 34, power circuitry 32 and solar panel assembly 40. Examples of other mobile electricity generator configurations are disclosed in U.S. Pat. No. 8,854,794, entitled "MOBILE ELECTRICITY GENERATOR USING SOLAR PANELS," U.S. Pat. No. 8,654,512 entitled "MOBILE ELECTRICITY GENERATOR USING SOLAR, WIND AND FUEL-GENERATED POWER," and U.S. Pat. No. 8,295,033 entitled "MOBILE ELECTRICITY GENERATOR USING SOLAR, WIND, AND FUEL-GENERATED POWER," the disclosures or which are hereby incorporated herein by reference.

Figure 4:
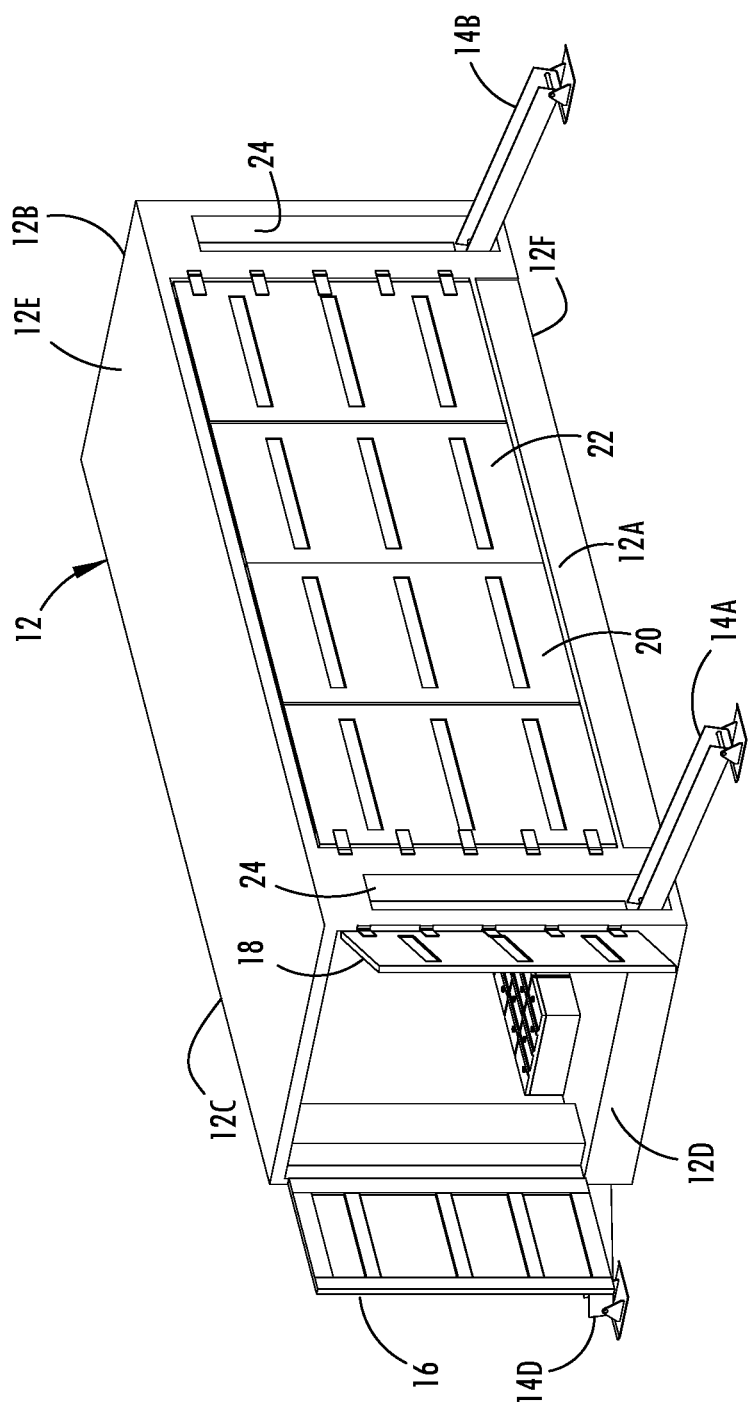
FIG. 4 is a front perspective view of the electricity generator with the retractable legs of the base container in a deployed position and the optional wind turbine omitted.

The base container 12 provides a base which serves the purpose of supporting the various components and further is shown configured as a housing containing and at least partially covering various components of the unitary assembly including the fuel-based generator 30, the solar panel assembly 40, the pack of batteries 34 and power circuitry 32. The electricity generator 10 may employ a base such as an open trailer that supports the various components without containing the components within an enclosed housing, according to other embodiments. The base container 12 can be made from steel or other structurally supportive material. As seen in FIGS. 1, 2, and 4, a pair of end side doors 16 and 18 pivot between a closed position and an open position allowing access to the components stored within the base container 12.

Referring to FIGS. 4-9, the electricity generator 10 is shown with the solar panel assembly 40 in various positions during the deployment of the solar panel assembly 40, according to one embodiment. As seen in FIG. 4, the solar panel assembly 40 is completely contained within the base container 12 when front doors 20 and 22 are in the closed position. To deploy the solar panel assembly 40, the front doors 20 and 22 rotate and pivot outward about opposite ends of the front wall 12A of the base container 12 to a fully open position shown in FIG. 5. The front doors 20 and 22 may open and close manually or with the assistance of one or more actuators.

The deployable solar panel assembly 40 includes a first group 42 of door mounted solar panels supported by the first door 20 and connected to the inside wall of the first door 20. The first group 42 of solar panels is shown as a linearly deployable solar panel array 42 that may be linearly deployed between an extended position and a collapsed position. With the first door 20 in the fully open position, the first group 42 of solar panels 48 is extended outside of the base container 12 in a forward position.

Figure 5:
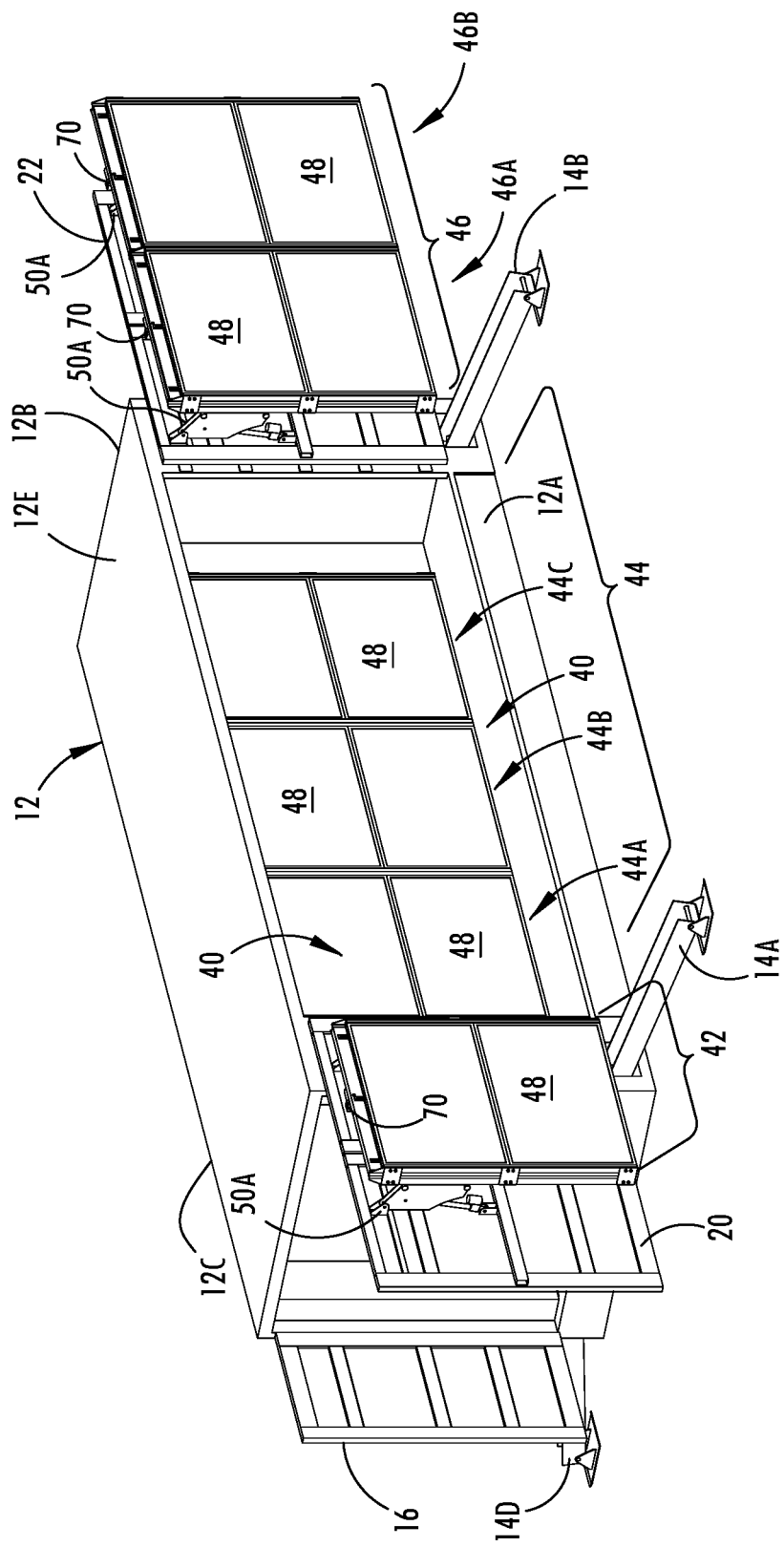
FIG. 5 is a front perspective view of the electricity generator shown in FIG. 4 with the solar panel access doors supporting solar panels in the open position.
Figure 6:
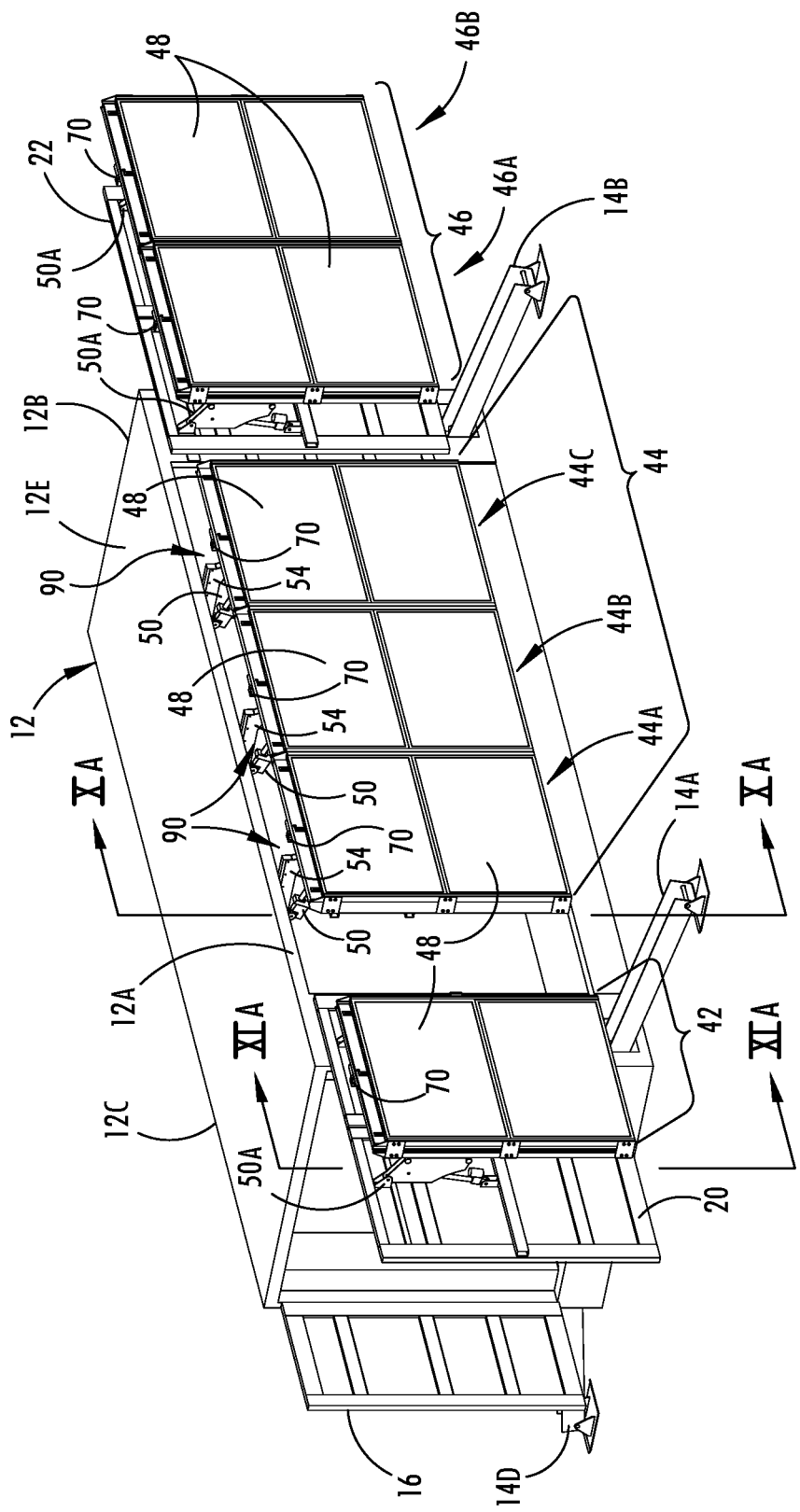
FIG. 6 is a front perspective view of the electricity generator shown in FIG. 5 with the central solar panels shown in a forward and outward position during deployment.

The solar panel assembly 40 also includes a second group 44 of solar panels 48 shown in FIG. 5 disposed within the base container 12. The second group 44 of solar panels 48 is movably mounted within the base container 12 and coupled to a track assembly 90 having an upper track 91, a lower track 92 and roller assemblies 94 (FIGS. 13 and 14) for allowing movement of the second group 44 of solar panels 48 between a rearward stowed position within the internal volume 14 of the base container 12 and a forward use position outside the internal volume 14 and forward of the base container 12. The upper and lower tracks and roller assemblies of track assembly 90 may be provided on the top end of the second group 44 of solar panels 48 such that the solar panels 48 hang from the track assembly 90 and move forward and rearward between deployed and stowed positions, respectively. Alternatively, other movable assemblies may be employed to support and allow the second group 44 of solar panels 48 to move between the deployed and stowed positions. The second group 44 of solar panels 48 may be actuated to a forward position as seen in FIG. 6 so that the second group 44 of solar panels 48 is moved outside the internal volume 14 and forward of the base container 12. Actuation of the second group 44 of solar panels 48 on the track assembly 90 may be achieved with an actuator, such as a motor, according to one embodiment. Alternatively, the second group 44 of solar panels 48 may be manually actuated by pulling the second group 44 of solar panels 48 forward or pushing the second group 44 of solar panels 48 from inside the container 12 to the outward position and pushing or pulling the second group 44 of solar panels 48 rearward to the stowed position. The second group 44 of solar panels 48 includes three linearly deployable solar panel arrays 44A-44C which are linearly actuatable to linearly deploy a plurality of solar panels into an extended linear deployed configuration and back to a collapsed position.

The solar panel assembly 40 further includes a third group 46 of solar panels 48 supported by the second door 22 and connected to the inside surface of the second door 22. The third group 46 of solar panels 48 includes a pair of linearly deployable solar panel arrays 46A and 46B that are linearly deployable between an extended use position and a collapsed position. With the second door 22 in the open position, the third group 46 of solar panels 48 is extended outside of the base container 12 in a forward position.

Figure 6A:
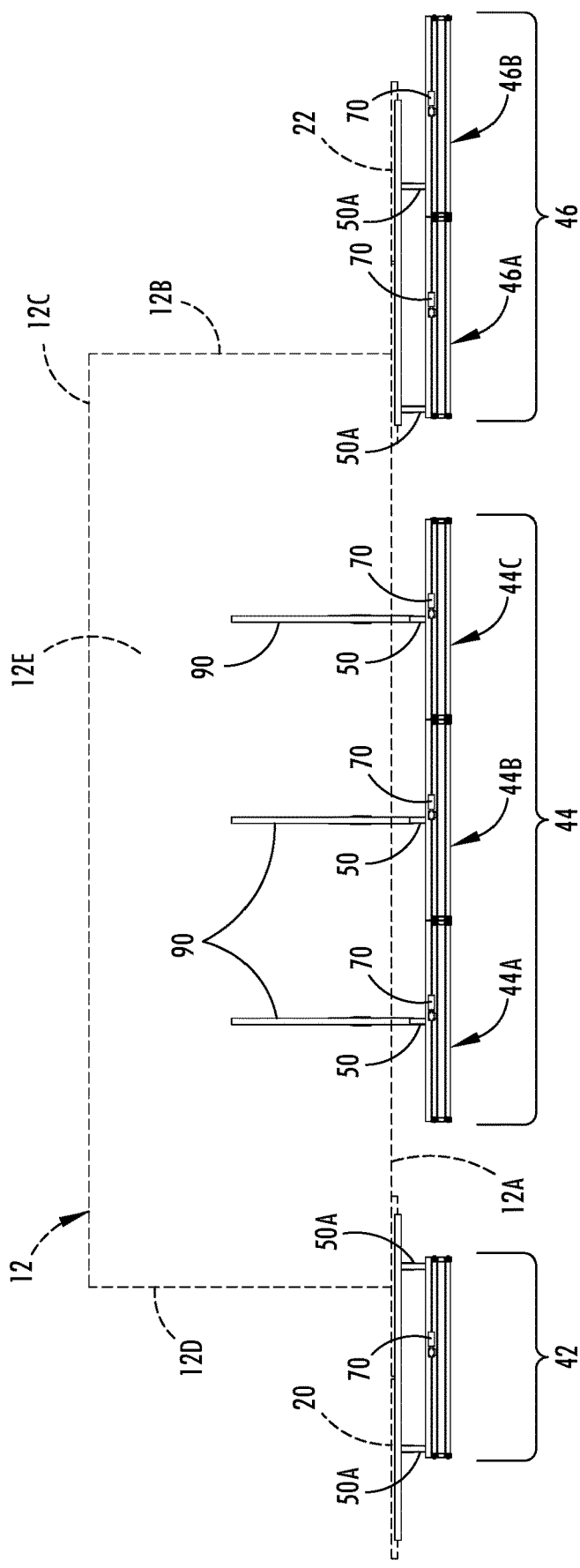
FIG. 6A is a schematic top view of the solar panel assembly partially deployed from the base container as shown in FIG. 6.

Referring now to FIG. 6A, the solar panel assembly 40 is further illustrated in the partially deployed position extended forward and outside of the base container 12 as shown in FIG. 6. The first group 42 of solar panels 48 is shown connected to the first door 20 by a pair of power actuated assemblies 50A. The power actuated assemblies 50A actuate to pivot the first group 42 of solar panels 48 amongst a plurality of rotated positions. The second or central group 44 of solar panels 48 are connected to roller assemblies 90 via each of the respective linear solar panel arrays 44A-44C. Each linear solar panel array 44A-44C connects to a roller bracket via a power actuated assembly 50 that actuates to pivot the respective solar panel arrays 44A-44C amongst a plurality of rotated positions. The third group 46 of solar panels 48 is connected to the second door 22 by way of a pair of power actuated assemblies 50A that actuate to rotate the respective linear solar panel arrays 46A and 46B amongst a plurality of rotated positions. Additionally, each of the linear solar panel arrays 42, 44A-44C, 46A and 46B includes an actuator assembly 70, which includes an electric motor, for linearly deploying the plurality of solar panels 48 between extended (deployed) and collapsed (stowed) positions.

Figure 7:
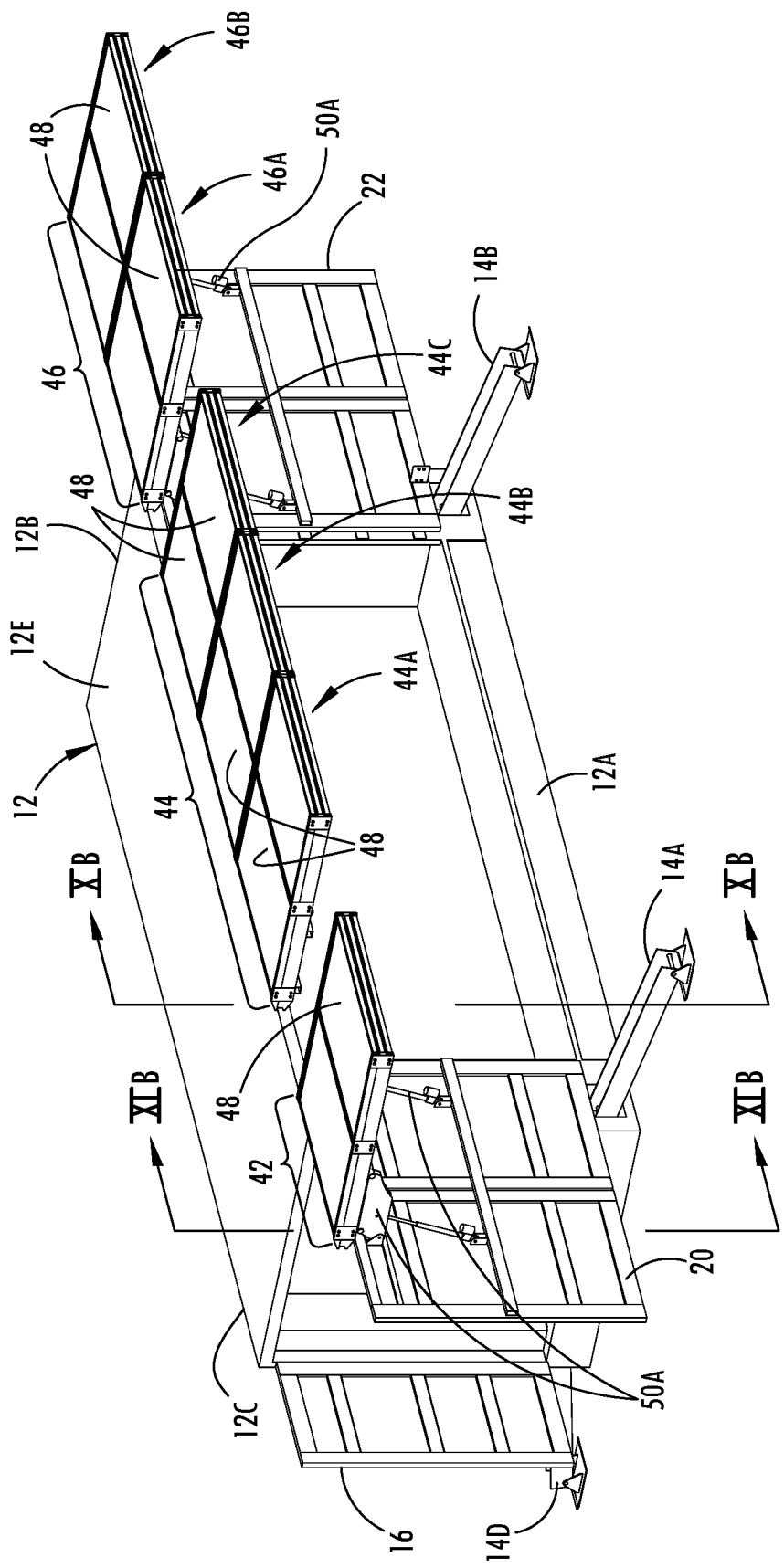
FIG. 7 is a front perspective view of the electricity generator shown in FIG. 6 with the solar panels rotated upward.
Figure 8:
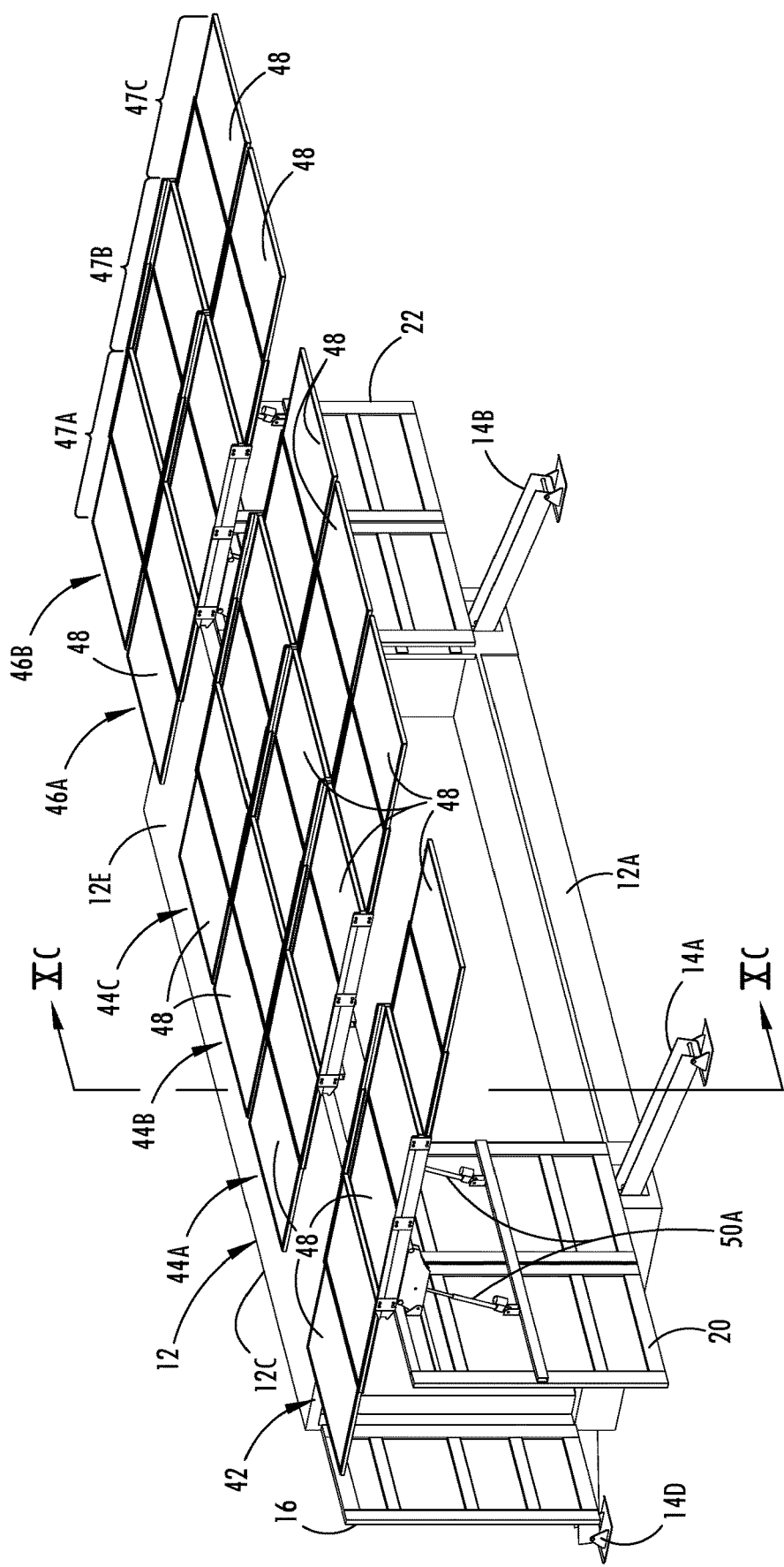
FIG. 8 is a front perspective view of the electricity generator with the solar panels linearly extended to a fully deployed position.
Figure 9:
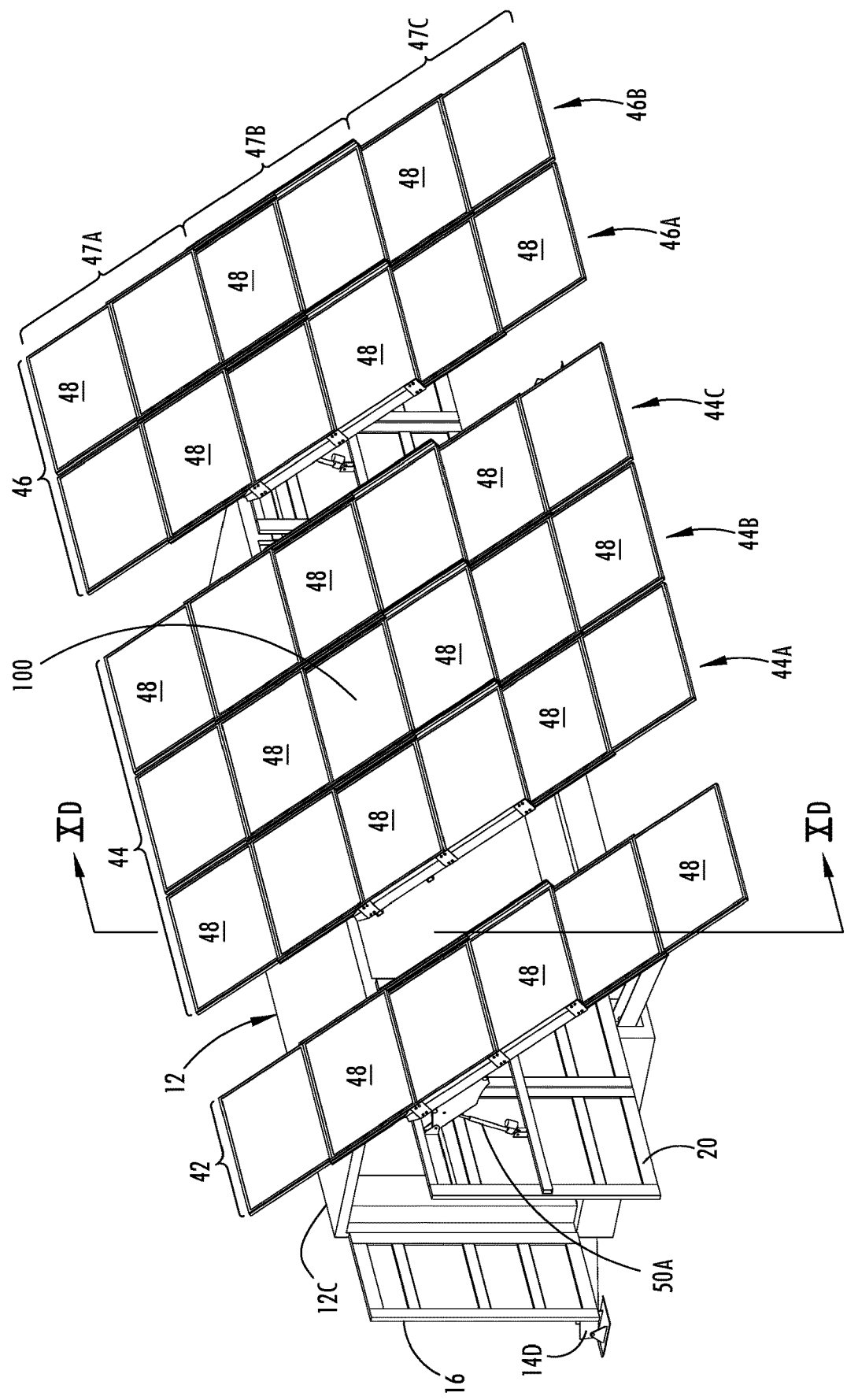
FIG. 9 is a front perspective view of the electricity generator shown in FIG. 8 with extended solar panels shown rotated in a further deployed position.

The solar panel assembly 40 may further be deployed to a rotated position as shown in FIG. 7, according to one example. In this position, the solar panels 48 are shown in a generally horizontally position elevated generally above the top 12E of the base container 12. However, it should be appreciated that the solar panel arrays may be rotated to another position prior to being further deployed to the extended panel position. The rotation of each of the linear solar panel arrays 42, 44A-44C, 46A and 46B is achieved by the power actuator assemblies 50 and 50A each having a motor actuating a bracket about a pivot axis to rotate the corresponding linear solar panel array. Next, as shown in FIG. 8, each of the linear solar panel arrays 42, 44A-44C, 46A and 46B are further deployed to an extended panel position in which the solar panels 48 within solar panel frames 47A-47C are extended by sliding linearly in opposite directions in a linear array such that panels 47A and 47C slide in opposite directions relative to the fixed middle panel 47B. In the embodiment shown, each of the linear solar panel arrays includes a linear array of six solar panels supported by three frames 47A-47C that slidingly extend relative to one another in a linear direction and the frames 47A-47C remain parallel to one another. Each solar panel frame 47A-47C is shown having two solar panels 48. However, it should be appreciated that each frame 47A-47C may include one or more solar panels 48. Linear movement of the solar panel frames 47A and 47C relative to frame 47B is achieved with the linear actuator 70 having a motor 72 driving three timing belts 78 (FIGS. 12-15A) that pull the solar panel frames 47A and 47C in opposite directions from one another and from the middle frame 47B to the extended position and toward one another to the collapsed position. The solar panel assembly 40 may further rotate the linear solar panel arrays by the actuator assemblies 50 and 50A to a use position shown in FIG. 9 in which the solar panels 48 are oriented on a slope or pitch to receive sunlight from a solar energy source, such as the sun, and generate electricity from the solar energy. It should be appreciated that the solar panel arrays may be rotated about a horizontal axis to various positions that optimize the solar radiation received from the sunlight so as to maximize the energy collection and thus the production of electricity.

Figure 10A:
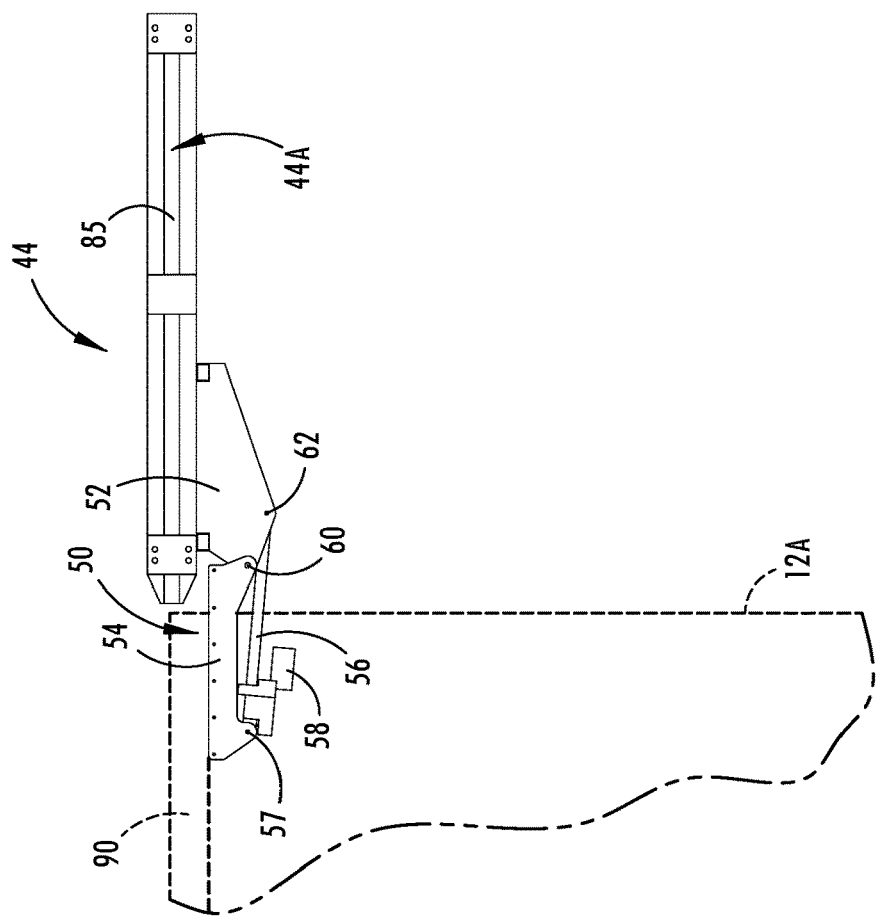
FIG. 10A is a partial cross-sectional view of the solar panel assembly taken through line XA-XA of FIG. 6.
Figure 10B:
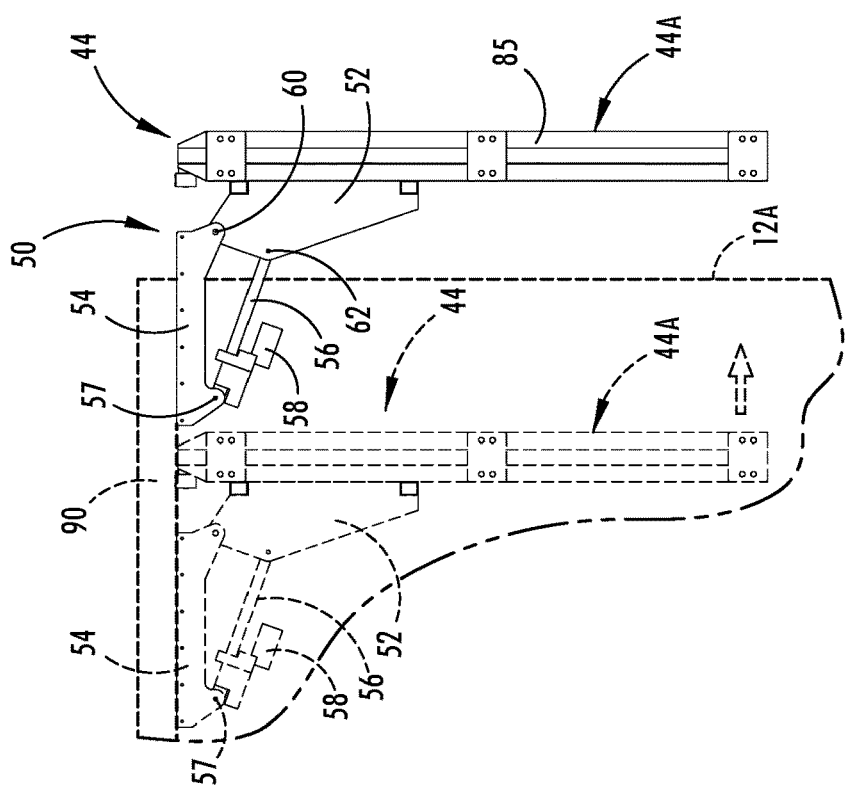
FIG. 10B is a partial cross-sectional view of the solar panel assembly taken through line XB-XB of FIG. 7.

Referring to FIGS. 10A-10D, one of the linear solar panel arrays 44A of the second group 44 is illustrated connected to the power actuator assembly 50, according to one embodiment. The power actuator assembly 50 includes a pivoting bracket 52 connected to the linear solar panel array 44A and a sliding bracket 54 which, in turn, is connected to the roller track assembly 90. The roller track assembly 90 may move the solar panel array 44A on a roller track between a stowed position within the base container 12 and an outward extended position as shown in FIG. 10A. The brackets 52 and 54 are pivotally connected together at a pivot pin 60 that forms a pivoting axis of the linear solar panel array 44A. A motor 58 is provided to drive a drive rod 56 which is connected at one end at point 57 of bracket 54 and the opposite end at point 62 on bracket 52 to actuate bracket 52 and hence the linear solar panel array 44A between various rotated positions that pivot about pivot axis 60. The motor 58 may actuate the linear solar array 44A approximately ninety degrees (90°) between the vertical position as shown in FIG. 10A and the horizontal position shown in FIG. 10B by extending the drive rod 56 between its retracted and fully extended positions.

Figure 10C:
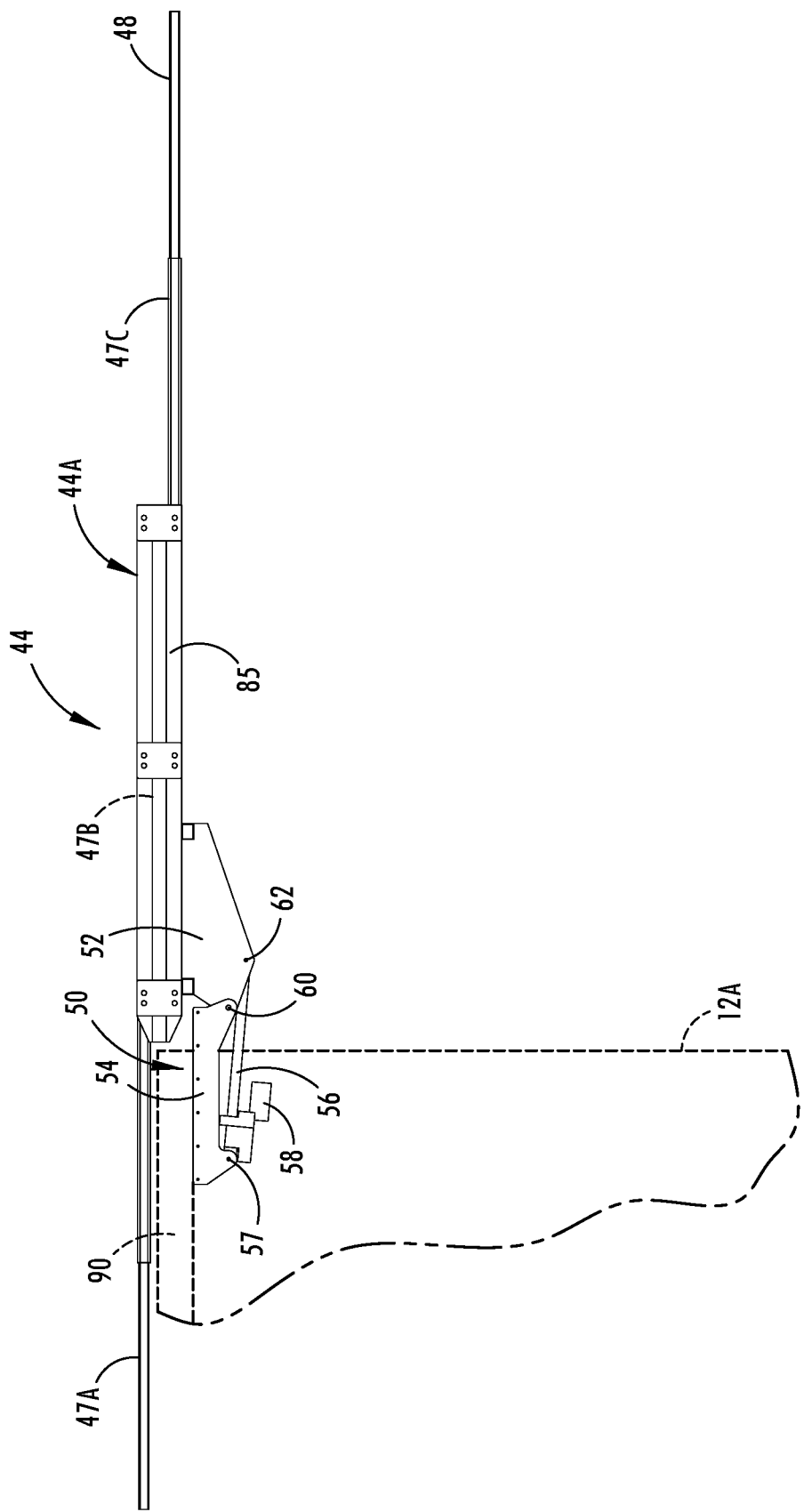
FIG. 10C is a partial cross-sectional view of the solar panel assembly taken through line XC-XC of FIG. 8.
Figure 10D:
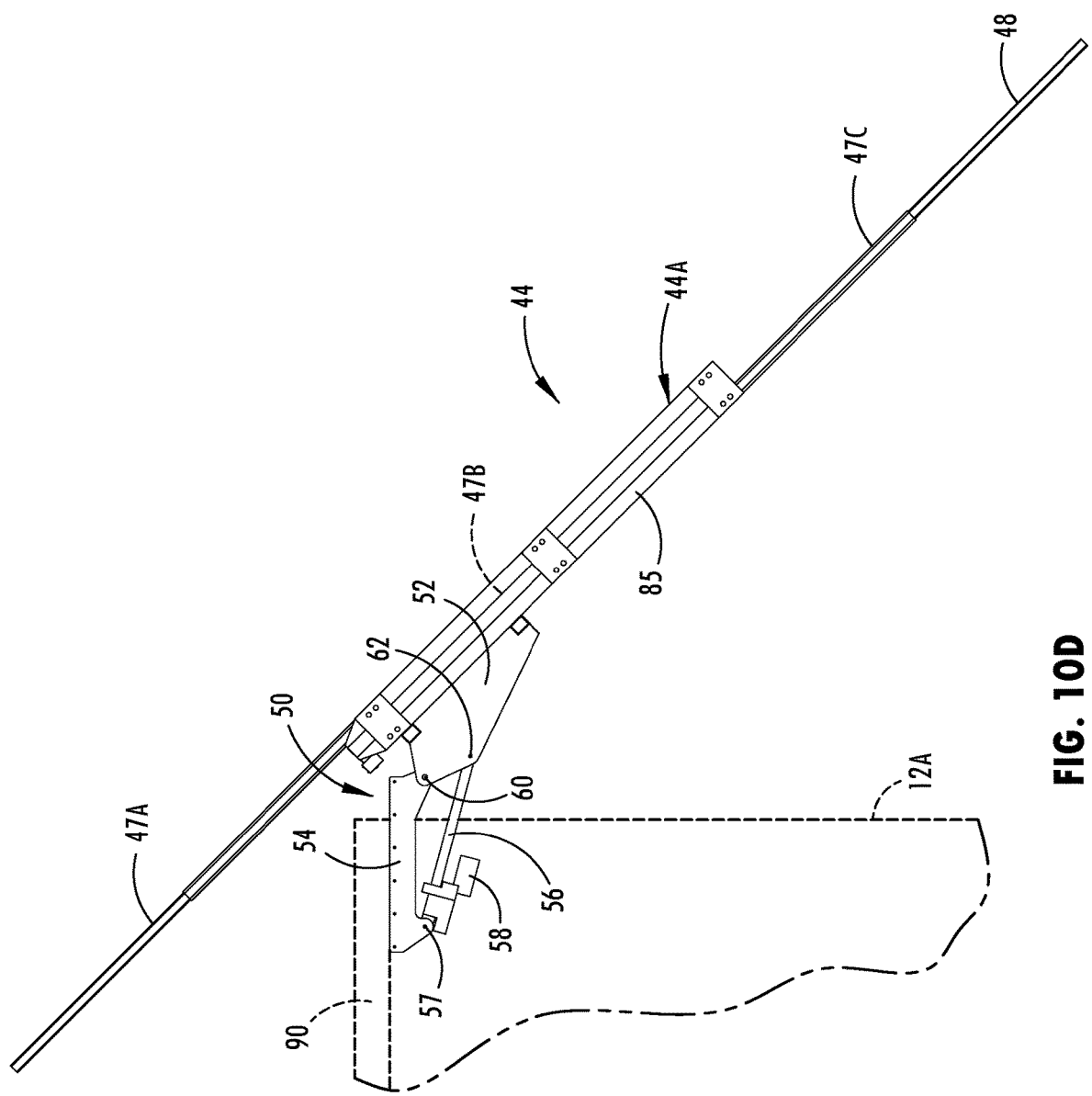
FIG. 10D is a partial cross-sectional view of the solar panel assembly taken through line XD-XD of FIG. 9.

The linear solar panel array 44A is linearly extendable to extend the solar panels thereon in a linear fashion to the extended position as shown in FIG. 10C. This is achieved by actuating the linear actuator assembly 70 such that solar panel frames 47A and 47C extend by sliding linearly outward in opposite directions parallel to the middle solar panel frame 47B, to a fully extended position. Each of the solar panel frames 47A, 47B, and 47C includes first and second solar panels 48, such that the linear array 44A includes an array of 1×6 solar panels 48, according to one embodiment. In FIG. 10D, the linear solar panel array 44A is shown rotated down to an inclined position which may generally better face the source of the sunlight at a given location to collect solar radiation by further activating the power actuator assembly 50. It should be appreciated that the linear solar panel arrays 44B and 44C each are likewise connected to a powered actuator assembly 50, and may move simultaneous with linear solar panel array 44A and the other solar panel assemblies.

The linear solar panel arrays 42, 46A and 46B are likewise each connected to a power actuator assembly 50A which is connected to the inside structure of the respective doors 20 or 22. The power actuator assembly 50A employed to rotate the linear solar panel arrays 42, 46A and 46B is shown in FIGS. 11A and 11B for actuating linear solar panel array 42. In this embodiment, the pivoting bracket 52A is fixedly attached to the door 20 near a top end at pivot pin 60 and is fixedly connected to the linear solar panel array 42 to allow pivoting motion of the solar panel array 42. The motor 58 actuates a drive rod 56 which is connected to a fixed bracket 59 at point 57 on the door 20 at one end and to point 62 of bracket 52A at the opposite end. As such, the motor 58 actuates the linear solar panel array 42 to rotate between a vertical position shown in FIG. 11A and a horizontal position shown in FIG. 11B. It should be appreciated that the linear solar panel array 42 may further be deployed by linearly extending the solar panel frames 47A-47C with a linear actuator 70 to the fully extended position as shown in FIGS. 10C and 10D. It should be appreciated that the linear solar panel arrays 46A and 46B each are likewise connected to a powered actuator assembly 50A to rotate the solar panel arrays 46A and 46B and extend and the solar panel arrays 46A and 46B may collapse linearly and may move simultaneous with the other solar panel arrays.

Figure 13A:
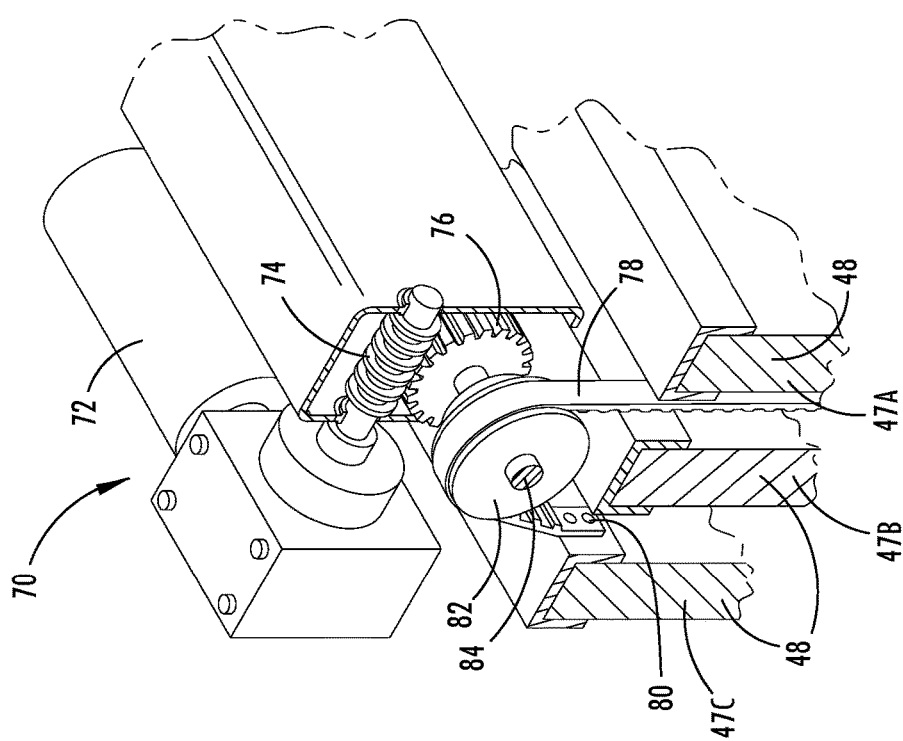
FIG. 13A is an enlarged view of section XIIIA of FIG. 13 further illustrating the solar panel linear actuation assembly in the collapsed position.
Figure 13:
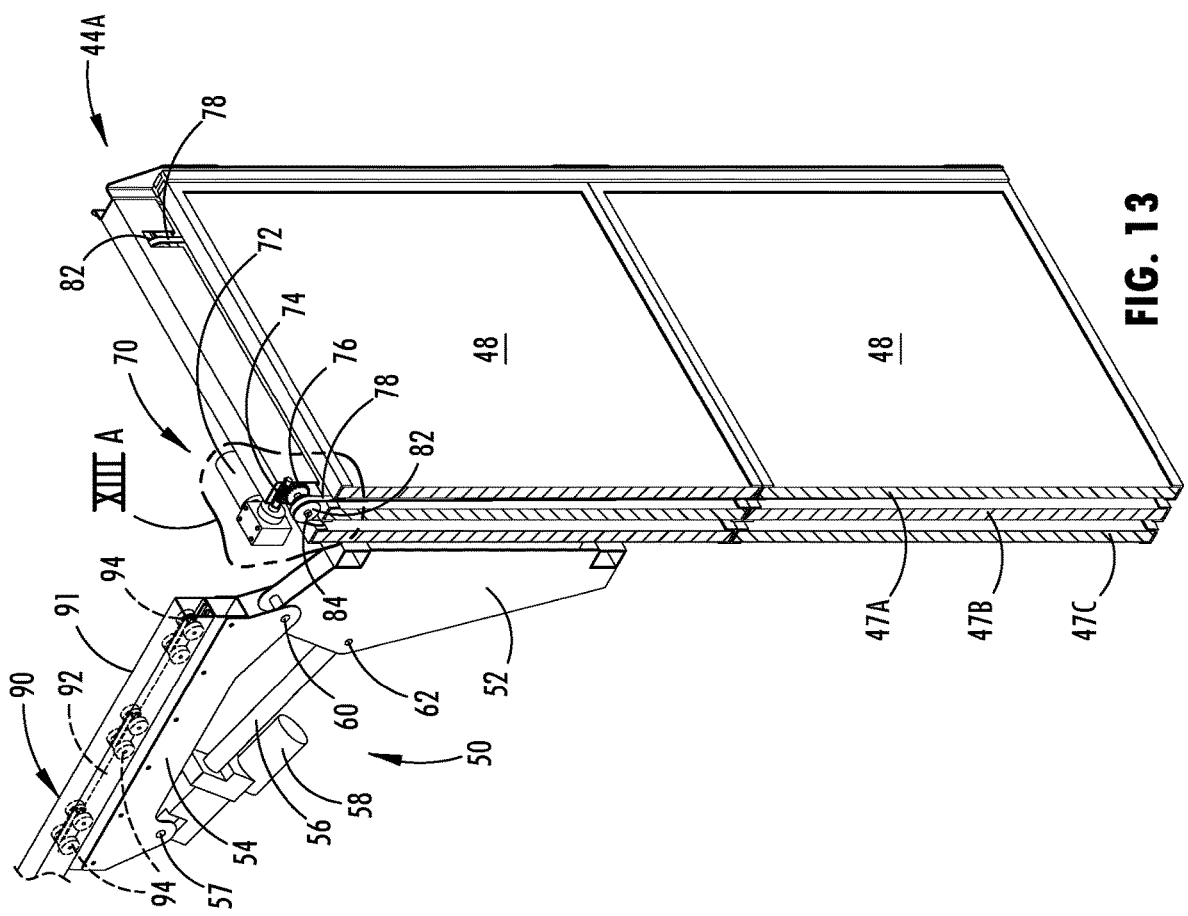
FIG. 13 is a front perspective view of the central linear solar panel array of FIG. 12 in the collapsed position.
Figure 14:
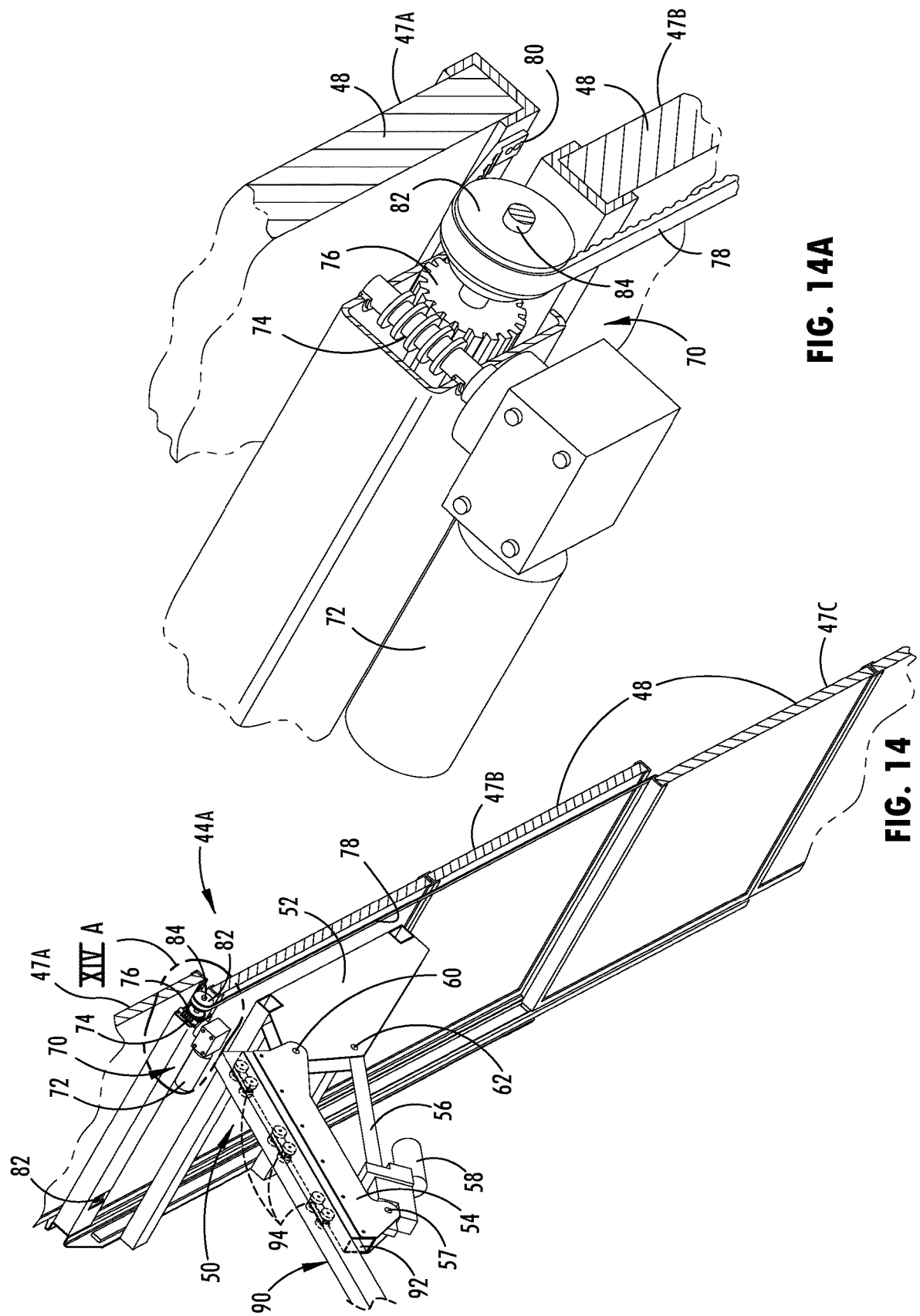
FIG. 14 is a rear perspective partial view of the solar panel array in the fully deployed position.
Figure 15:
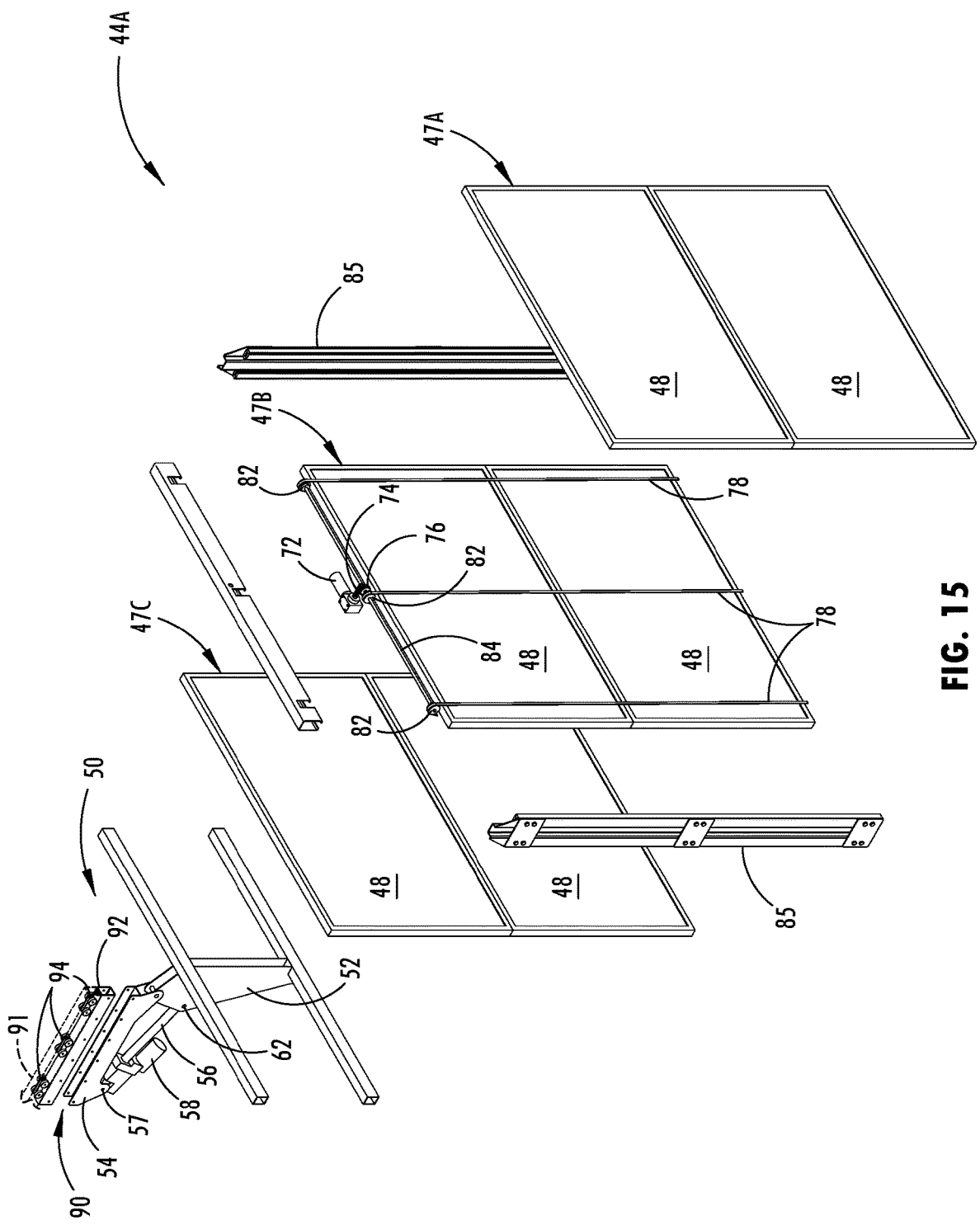
FIG. 15 is an exploded view of the central solar panel linear array shown in FIG. 13.
Figure 15A:
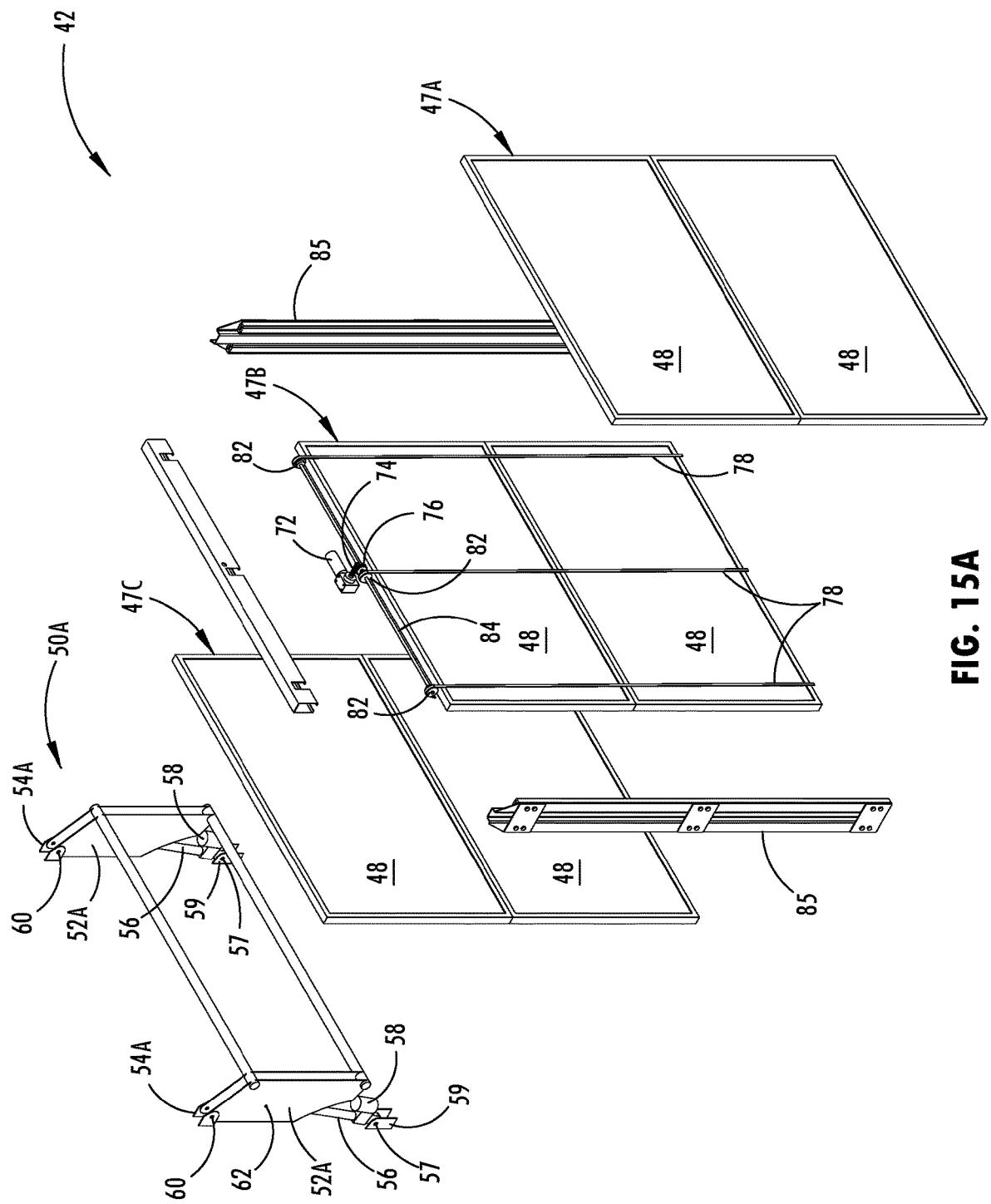
FIG. 15A is an exploded view of the door mounted solar panel array shown in FIG. 12A.

Referring to FIGS. 12-15A, the linear actuator assembly 70 for actuating the linear solar panel array to extend the solar panels 48 linearly between extended and stowed positions is further illustrated. The linear actuator assembly 70 includes a drive motor 72 for driving gears 74 and 76 which, in turn, drive a drive shaft 84 and the three timing belts 78 connected thereto. The timing belts 78 include end belts on opposite ends and a middle belt therebetween. Each timing belt 78 is connected to opposite ends of the solar panel frames 47A and 47C so that the timing belts 78 can drive the solar panel frames 47A and 47C to an extended solar panel position in one direction and a retracted solar panel position in the opposite direction. In the collapsed or retracted position, solar panel frame 47B is sandwiched between solar panel frames 47A and 47C. As seen in FIG. 13A, the motor 72 is connected to first gear 74 which drives second gear 76 to turn drive shaft 84 and belt wheels 82 that drive the timing belts 78 in a first direction. Each timing belt 78 is connected at one end of the solar panel frame 47C at point 80 as seen in FIG. 13A and is connected at an opposite end of solar panel frame 47A at point 80 as seen in FIG. 14A so that the solar panel frames 47A and 47C can be moved in opposite directions depending on the direction of the motor 72. As such, the motor 72 drives the timing belts 78 and hence, the solar panel frames 47A and 47C between extended and collapsed positions. The motor 72 may drive the timing belts 78 to drive the solar panel frame 47A to the extended position and may use gravity to extend the solar panel frame 47C, when the linear solar panel array is oriented at an angle with solar panel frame 47C extending downward towards the ground, according to one embodiment. In doing so, the solar panel frames 47A and 47C may be disposed and aligned within a track defined by side panels 85 (FIG. 15) on opposite sides that allows for the solar panel frames 47A and 47C to slide in planes that are parallel to frame 47B and to one other. According to another embodiment, a different number and configuration of belts may be employed to drive the solar panel frames 47A and 47C between the extended and collapsed positions. In one embodiment, the belts 78 may be configured as or replaced with one or more chains and sprockets, such as a bicycle chain drive. It should be appreciated that other actuator mechanisms may be employed for actuating the solar panel frames 47A and 47C between collapsed and extended positions, such as a worm gear or other screw drive assembly.

Figure 16:
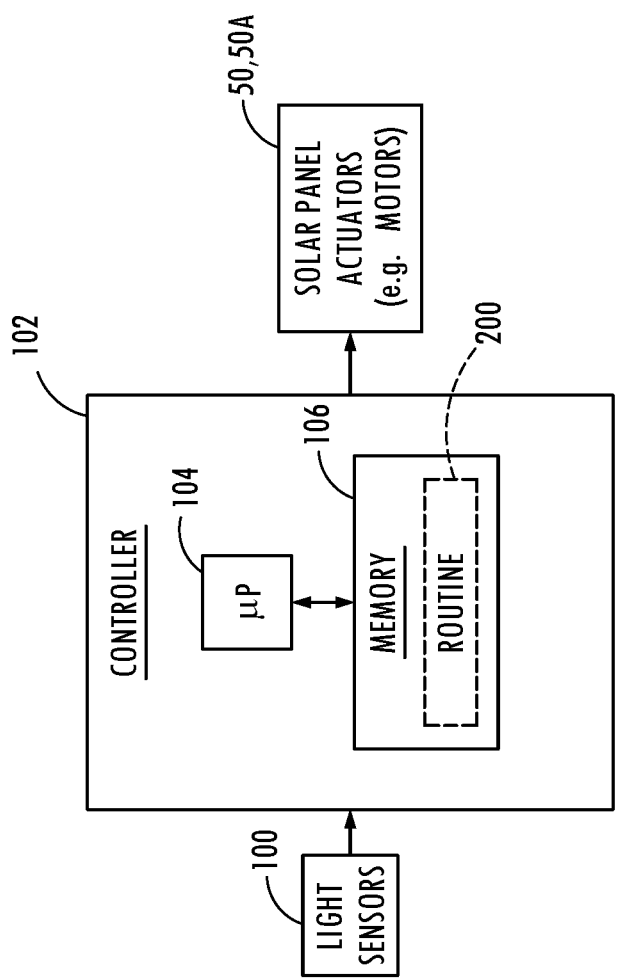
FIG. 16 is a block diagram illustrating a control system of the solar panel assembly to track the position of the sun and adjust the position of the solar panels.

Referring to FIG. 16, a control system is illustrated for controlling the position of the solar panels to optimize receiving solar radiation. The control system includes a controller 102 which may include a microprocessor 104 and memory 106. Stored within memory 106 and executed by the microprocessor 104 is a control routine 200. A light sensor 100 is provided for sensing light and providing an input to the controller 102. The light sensor 100 may include one or more light sensors or photosensors located on the solar panels or frame and provide an indication of the intensity and the location of a source of solar radiation such as the sun. By processing the light sensor signal, the controller 102 may determine the location of the sun and may control the positioning of the solar panels to face the sun to optimize the receipt of the solar radiation. As such, the controller 102 provides an output to the solar panel actuators 50 and 50A to position the solar panels in a desired position. It should be appreciated that the controller 102 may control the position of the solar panels to track the position of the sun based on historical data. For example, by knowing the location that the sun is expected to be in for a given day of the year, the location of the electricity generator 10 and time of day, the controller 102 may control the solar panel actuators 50 and 50A to track the position of the sun based on its known location.

Figure 17:
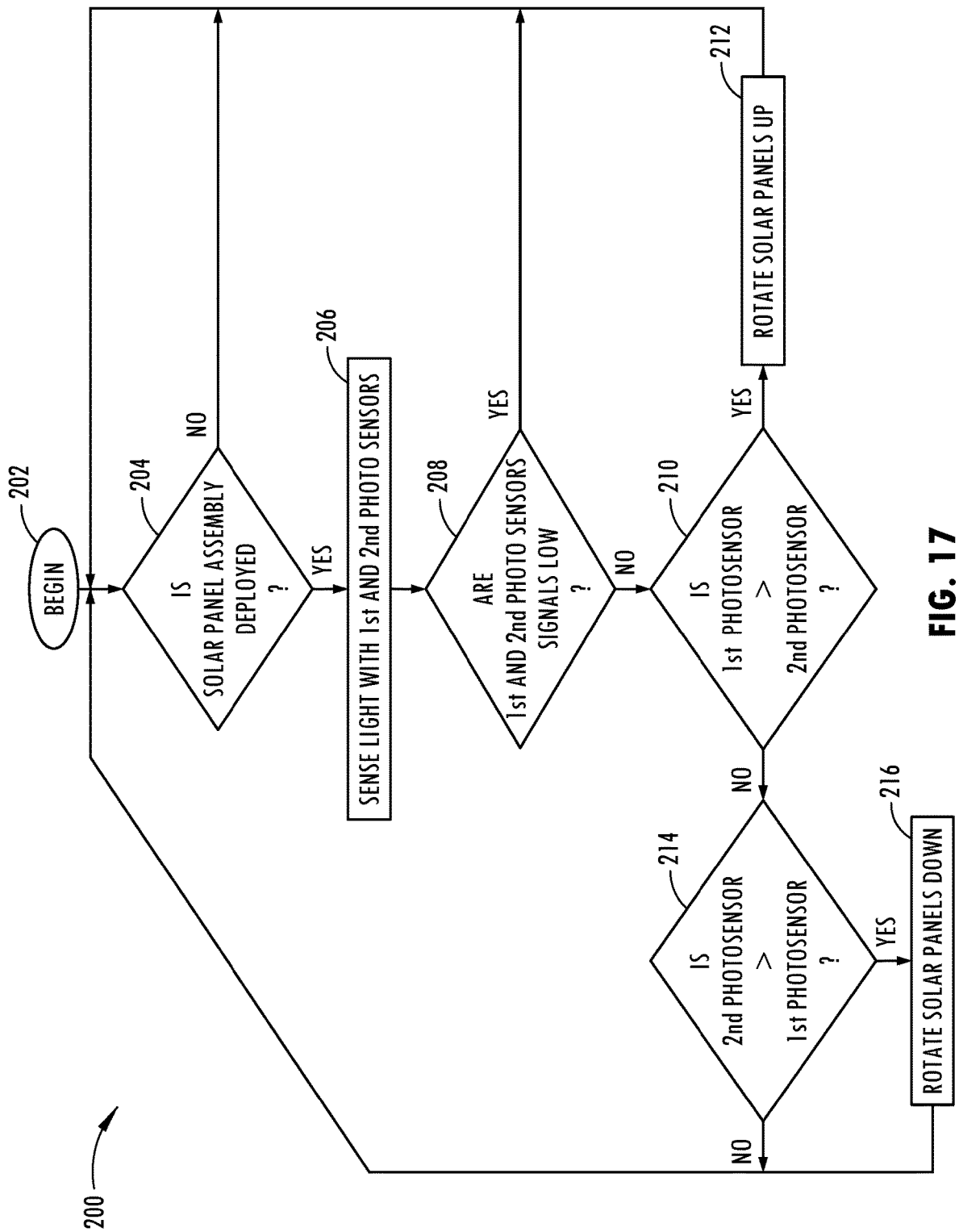
FIG. 17 is a flow chart illustrating the control routine of FIG. 16 for controlling the position of the solar panels to track the sun.

The control routine 200 for controlling the position of the solar panels to track the sun is illustrated in FIG. 17, according to one embodiment. Routine 200 beings at step 202 and proceeds to decision step 204 to determine if the solar panel assembly is deployed and, if not, returns to the beginning. If the solar panel assembly is deployed, routine 200 proceeds to step 206 to sense sunlight with first and second photosensors of the light sensors. The photosensors may include photoresistors. The first and second photosensors may sense light intensity in different directions. Proceeding to decision step 208, routine 200 determines if the first and second photosensor signals are both low, and if so, returns to the beginning. If there is sufficient light detected by at least one of the first and second light sources, routine 200 proceeds to decision step 210 to determine if the first photosensor signal is greater than the second photosensor signal, and if so, rotates the solar panels upward towards the sensing direction of the first photosensor in step 212. Otherwise, routine 200 proceeds to decision step 214 to determine if the second photo sensor is greater than the first photosensor signal and, if so, rotates the solar panels downward towards the increased light intensity sensed by the second photosensor. Accordingly, the solar panels may be moved upward or downward depending on the direction of the greater sensed sunlight. It should further be appreciated that the solar panel assemblies may be moved in other directions, according to other axis to sense and track a greater amount of light intensity and to move the solar panels to receive increased light intensity, thereby maximizing the light optimization received and thus enhancing the electricity generator. According to one embodiment, the solar panel assemblies may be moved about two different axes, such as two perpendicular horizontal axes. In yet a further embodiment, the solar panel assemblies may further move about a third axis, such as a vertical axis.

In the embodiment shown, six solar panel arrays each having three frames and six solar panels are shown provided. However, it should be appreciated that any number of solar panel arrays each having a plurality of frames and solar panels may be employed.

It should be appreciated that a user can use the above electricity generator 10 to provide electricity to one or more devices that require electricity. A user may readily transport the electricity generator 10 described above to a location near where the generation of electricity is desired. The user may then allow one or more of the following events to occur—(i) allowing the wind turbine 26 to transform wind into electricity; (ii) allowing a solar panel assembly 40 to transform light into electricity; and (iii) allowing the fuel-based generator 30 to transform fuel (such as diesel, gasoline, natural gas, ethanol, or any other fuel) into electricity. The user may further present one or more devices that requires electricity to operate and electrically connects the device(s) that requires electricity to operate to the electricity generator 10. The user can connect the device(s) to whichever cable supplies the type of electricity that the device requires. The electricity generator 10 can be located anywhere, but may be best located where electricity is not already supplied, like a maritime vessel (especially when docked), a construction site, and a military base (especially a forward military base). The aforementioned steps need not occur consecutively.

In the foregoing description, it will be readily appreciated by those skilled in the art that modifications may be made to the invention without departing from the concepts as disclosed herein. Such modifications are to be considered as included in the following claims, unless those claims by their language expressly state otherwise.

What is claimed is:

1. An electricity generator comprising:
   a base comprising side walls defining an interior volume, wherein at least one of the side walls comprises one or more doors for allowing access to the interior volume;
   a movable solar panel assembly comprising a support structure coupled to a track for allowing movement of the solar panel assembly between a stowed position within the interior volume and a use position outside of the interior volume, wherein the solar panel assembly comprises a plurality of solar panels arranged in a contiguous array that slide away from one another to an extended deployed position and toward one another to a collapsed position while remaining parallel to one another, wherein the plurality of solar panels comprise a first solar panel frame, a second solar panel frame, and a third solar panel frame; and a drive assembly for moving the first and third solar panel frames in opposite first and second directions between the collapsed position where the second panel frame is sandwiched between the first and third panel frames and the extended deployed position where the first solar panel frame extends outward from the second solar panel frame in the first direction and the third panel frame extends outward from the second solar panel frame in the opposite second direction.

2. The electricity generator of claim 1, wherein the solar panels are supported by the first, second and third solar panel frames that slide relative to one another.

3. The electricity generator of claim 1, wherein the drive assembly comprises a linear actuator that moves the first and third solar panel frames to slidably extend linearly outward from the second solar panel frame to the extended deployed position.

4. The electricity generator of claim 3, wherein the linear actuator further moves the first and third solar panel frames to slidably extend linearly inwards towards the second solar panel frame to the stowed position.

5. The electricity generator of claim 1, wherein the track comprises a plurality of rollers for rolling the support structure between the stowed position within the internal volume of the base and the use position outside of the internal volume of the base.

6. The electricity generator of claim 1 further comprising an energy storage device operatively coupled to the one or more solar panels, wherein the energy storage device is capable of at least temporarily storing energy from electricity output from the plurality of solar panels.

7. The electricity generator of claim 6, wherein the energy storage device comprises a battery capable of at least partially storing the electricity.

8. The electricity generator of claim 1, wherein the electricity generator is mobile.

9. The electricity generator of claim 1 further comprising a fuel-based generator capable of transforming fuel into electricity.

10. The electricity generator of claim 1 further comprising a sensor for tracking a position of a source of solar energy, wherein the orientation of the solar panel assembly is movably controlled based on the sensed position of the source of solar energy.

11. An electricity generator comprising:
a base;
a movable solar panel assembly comprising a plurality of solar panels arranged in a contiguous array that move linearly away from one another to a fully extended position and toward one another to a collapsed position while remaining parallel to one another, wherein the plurality of solar panels comprises a first solar panel frame, a second solar panel frame, and a third solar panel frame; and
a drive assembly for moving the first and third solar panel frames in opposite first and second directions between the collapsed position where the second panel frame is sandwiched between the first and third panel frames and the fully extended position where the first solar panel frame extends outward from the second solar panel frame in the first direction and the third panel frame extends outward from the second solar panel frame in the opposite second direction.

12. The electricity generator of claim 11, wherein the base comprises one or more doors for allowing access to the interior volume, and wherein the movable solar panel assembly comprises a support structure that allows movement of the solar panel assembly between a stowed position within the interior volume and a use position outside the interior volume.

13. The electricity generator of claim 11, wherein the drive assembly comprises a linear actuator that moves the first and third solar panel frames linearly away from and towards the second solar panel frame between the fully extended position and the collapsed position.

14. The electricity generator of claim 11 further comprising:
a sensor for sensing position of a solar energy source; and
a controller for controlling orientation of the solar panel assembly based on the sensed position of the solar energy source.

15. The electricity generator of claim 11 wherein the solar panel assembly further comprises an actuator for actuating the solar panel assembly to orient the solar panels.

16. The electricity generator of claim 11 further comprising an energy storage device operatively coupled to the one or more solar panels, wherein the energy storage device is capable of at least temporarily storing energy from electricity output from the one or more solar panels.

17. A method of producing electrical energy comprising:
providing a movable solar panel assembly stowable on the base, wherein at least one of the side walls comprises one or more doors for allowing access to the interior volume;
moving the solar panel assembly to a use position;
deploying the solar panel assembly by sliding a plurality of collapsed solar panels from a collapsed position within a contiguous array away from one another to an extended use position while remaining parallel to one another, wherein the solar panels comprise a first solar panel frame, a second solar panel frame, and a third solar panel frame, wherein a drive assembly moves the first and third solar panel frames in opposite first and second directions between the collapsed position where the second solar panel frame is sandwiched between the first and third solar panel frames and the extended use position where the first solar panel frame extends outward from the second solar panel frame in the first direction and the third solar panel frame extends outward from the second solar panel frame in the opposite second direction; and
generating electrical energy with the plurality of solar panels.

18. The method of claim 17, wherein the base comprises an interior volume and at least one door, wherein the solar panel assembly is moved from the interior volume to the use position outside the interior volume.

19. The method of claim 17 further comprising the steps of:
sensing a position of a solar energy source; and
controlling orientation of the solar panel assembly based on the sensed position of the solar energy source.

* * * * *